US005951000A

United States Patent [19]

Sato et al.

[11] Patent Number: 5,951,000

[45] Date of Patent: *Sep. 14, 1999

[54] SHEET POST-PROCESSING APPARATUS

[75] Inventors: Masaaki Sato, Kawasaki; Koichi Murakami; Yoshifumi Takehara, both of Yokohama; Yoshinori Isobe; Norifumi Miyake, both of Tokyo; Kenichi Hayashi, Kawasaki; Hiromichi Tsujino, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,773

[22] Filed: Apr. 2, 1997

Related U.S. Application Data

[63] Continuation of application No. 08/407,373, Mar. 20, 1995, abandoned.

[30] Foreign Application Priority Data

| | | | |
|---|---|---|---|
| Mar. 18, 1994 | [JP] | Japan | 6-048647 |
| Jan. 23, 1995 | [JP] | Japan | 7-008183 |

[51] Int. Cl.$^{6}$ .............................. B31B 1/70; B65G 57/00

[52] U.S. Cl. .................................... 270/58.11; 270/58.14; 270/58.19; 270/58.28

[58] Field of Search ............................. 270/58.01, 58.07, 270/58.08, 58.11, 58.14, 58.18, 58.19, 58.28

[56] References Cited

U.S. PATENT DOCUMENTS

| | | | |
|---|---|---|---|
| 3,995,748 | 12/1976 | Looney | 270/58 X |
| 4,295,733 | 10/1981 | Janssen et al. | 270/58 X |
| 4,361,393 | 11/1982 | Noto | 270/58 X |
| 4,370,052 | 1/1983 | Murakami et al. . | |
| 4,746,111 | 5/1988 | Naramore | 270/58 X |
| 4,928,941 | 5/1990 | Uto et al. | 270/53 |
| 4,938,467 | 7/1990 | Honjo et al. . | |
| 4,965,629 | 10/1990 | Hiroi et al. . | |
| 4,986,520 | 1/1991 | Shido et al. . | |
| 5,021,837 | 6/1991 | Uto et al. . | |
| 5,042,793 | 8/1991 | Miyake . | |
| 5,104,106 | 4/1992 | Shido et al. . | |
| 5,192,261 | 3/1993 | Honjo et al. . | |
| 5,384,634 | 1/1995 | Takehara et al. | 270/53 X |
| 5,449,157 | 9/1995 | Kawano et al. | 270/58 X |

FOREIGN PATENT DOCUMENTS

| | | | |
|---|---|---|---|
| 61-232372 | 10/1986 | Japan . | |
| 62-59002 | 3/1987 | Japan . | |
| 63-147775 | 6/1988 | Japan . | |
| 4-64491 | 2/1992 | Japan | 270/53 |
| 4-138291 | 5/1992 | Japan . | |
| 4-156392 | 5/1992 | Japan . | |
| 4-164692 | 6/1992 | Japan . | |

*Primary Examiner*—Hoang Nguyen
*Attorney, Agent, or Firm*—Fitzpatrick, Cella, Harper & Scinto

[57] ABSTRACT

A sheet post-processing apparatus includes a plurality of bin trays arranged in multiple levels with predetermined intervals; stacking device supported in said apparatus so as to be moved in an arrangement direction of the plurality of bins; discharging device for discharging a sheet; and transferring device for transferring the sheet to said stacking device from the bin tray having completed sheet reception.

43 Claims, 28 Drawing Sheets

SHEET POST-PROCESSING APPARATUS

This application is a continuation of application Ser. No. 08/407,373 filed Mar. 20, 1995 now abandoned.

FIELD OF THE INVENTION AND RELATED ART

The present invention relates to a post-image formation sheet processing apparatus, more specifically, an apparatus for sorting the sheets, which are discharged sequentially, one by one, from a sheet outputting apparatus, into a plurality of accumulating means, carrying out selectively sheet processing operations such as binding, and then stacking the sheets or sets of sheets.

As for a conventional post-image formation sheet processing apparatus, those disclosed in Japanese Laid-Open Patent Application Nos. 138,291/1992, 156,392/1992, and 164,692/1992 are well known.

The one disclosed in the Japanese Laid-Open Patent Application No. 138,291/1992 (first publication) comprises, as illustrated in FIG. 42: a sorter 302 for sorting the sheets discharged from the main assembly 301 of an image forming apparatus into a plurality of bins 302*b*; a stapler 302*d* for binding the sheets sorted into each bin: a sheet stacking section 305 disposed between an image forming apparatus 301 and the sorter 302; a sheet conveying path 304, through which the sheet is conveyed from the image forming apparatus 301 to the sorter 302; a discharging means 306 for discharging the sheets from the bin 302*b* into the stacking section 305; and means for moving each bin to the discharging means, wherein the sheets sorted into each bin are stapled and discharged into the stacking section.

The one disclosed in Japanese Laid-Open Patent Application No. 156,392/1992 (second publication) comprises, as illustrated in FIG. 43: a sorting section 307 for sorting and storing the sheet discharged from an image forming apparatus; a conveying path 309 disposed between the discharging section 308 of the image forming apparatus and the sorting section 307; a stapling apparatus 310 for binding sets of the sheets stored in the sorting section; and a stacking section 311 disposed below the conveying path 309 in order to store the bound sets of the sheets.

According to either first or second publication, the sheet sate are transferred from the sorting section to a separate stacking section so that sets of sheets exceeding the number of bins can be handled.

Further, according to the Japanese Laid-Open Patent Application No. 164,682/1992 (third publication), a sheet processing apparatus 313 is disposed on one of the lateral sides of an image forming apparatus 312, and this sheet processing apparatus comprises a sheet receiver 314, a discharging mechanism 315, and a stacking section 316, wherein the sheets discharged from the image forming apparatus are received by the sheet receiver 314, where the sheets are processed in a predetermined manner, and then discharged toward the front side of the apparatus, into the stacking section 316 by the discharging mechanism 315.

However, in the case of the conventional sheet processing apparatus disclosed in the first or second publication, there it only a single sheet conveying path for conveying the sheets to each bin or sorting section, and the sheet processing or the sheet set transfer to the stacking section is carried out after all the bins are filled with the sheets; therefore, the sheet discharge for the image forming apparatus must be temporarily halted while the sheet processing or sheet set transfer is carried out. As a result, the productivity of the image forming apparatus as the sheet outputting apparatus is substantially reduced, and also, a lot of time is wasted while the sheets are processed.

In the case of the one disclosed in the third publication, the stacking section, to which the sheet sets on the sheet receiver are transferred, protrudes beyond the front surface of the image forming apparatus; therefore, the overall size of the apparatus increases. Also, this structure requires a large number of components, which not only increases the cost, but also makes the apparatus unfriendly to operate.

SUMMARY OF THE INVENTION

The present invention was made in view of the aforementioned faults of the conventional sheet processing apparatus, and its primary object is to provide a post-image formation sheet processing apparatus capable of processing a large number of sheets without losing the productivity.

Another object of the present invention is to provide a post-image formation sheet processing apparatus of a reduced size, by using effectively the internal space of the sheet processing apparatus.

According to an aspect of the present invention, a post-image formation sheet processing apparatus capable of accomplishing the above objects comprises a plurality of accumulating means and a stacking means movable to stacking positions within the apparatus.

According to another aspect of the present invention, a post-image formation sheet processing apparatus comprises a plurality of accumulating means, and a stacking means, which is disposed on the upstream side of sheet outputting means, and moves to the stacking positions.

According to a further aspect of the present invention, a post-image formation sheet processing apparatus comprises a plurality of bin trays, stacking means movable along these plurality of bin trays, and a stapling means.

According to these aspects of the present invention, the sheets are delivered to one group of accumulating means, and are transferred as a set of sheets onto the stacking section after the sheet delivery is over, wherein while the sheet sets are transferred onto the stacking section from one group of accumulating means, the sheets are delivered to another group of accumulating means, so that the sheet processing apparatus can continuously accommodate the sheets discharged from the sheet outputting apparatus, without temporary stops, by repeating this switching between one group of accumulating means and the other (or switching among a plurality of groups).

As described above, according to the present invention applied for patent, a large number of sheets can be processed without reducing the productivity of the apparatus.

In addition, according to the present invention, the internal space of the apparatus can be effectively used; therefore, the overall apparatus size can be rendered compact.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the embodiments of the present invention will be described with reference to the drawings.

Embodiment 1

Figure 1:
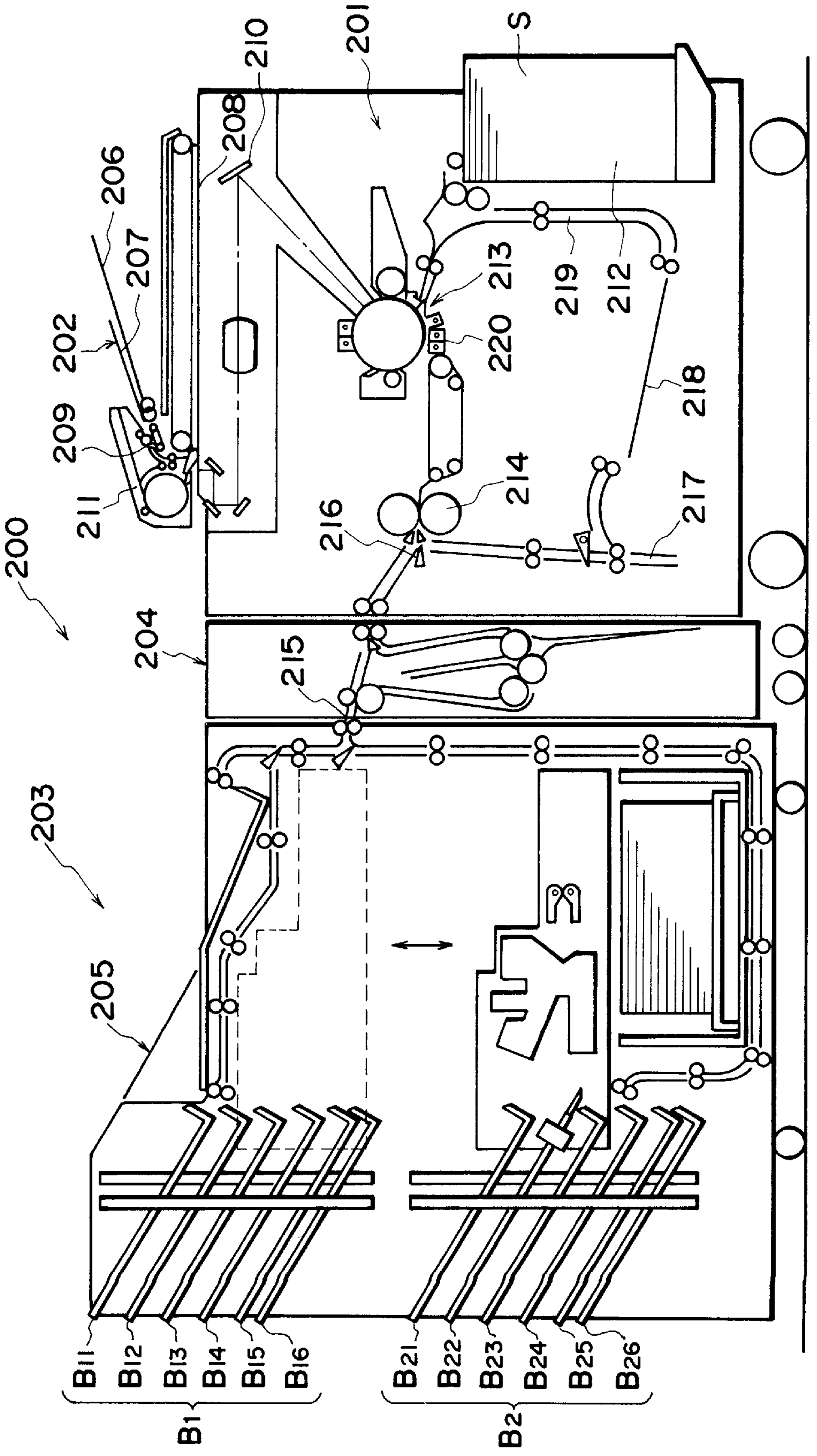
FIG. 1 is a schematic front view of a sheet outputting apparatus in the first embodiment of the present invention.

FIG. 1 illustrates an electro-photographic copying machine 200 (image forming apparatus) as a sheet outputting apparatus.

The electro-photographic copying machine 200 comprises an automatic original circulating apparatus 202 disposed on the main assembly of the copying apparatus, and a post-image formation sheet processing apparatus 203 (hereinafter, sheet processing apparatus) disposed next to the copying apparatus main assembly 201, on the side where a sheet S is discharged, and the sheet processing apparatus 203 comprises a folding apparatus 204 and a stapling-stacking apparatus 205.

A set of originals 207 placed in an original placing table 206 of the original circulating apparatus 202 is sequentially separated from the bottom side thereof. The separated original sheet is fed through a path 209 onto the platen glass 208 of the copying machine main assembly 201, where it is read by the optical system 210 of the copying machine main assembly 201. Then, the original sheet is conveyed from the platen glass 208, through a path 211, back to the original placing table, where it is placed on the uppermost sheet of the original set. The sheet S is fed from a deck 212 to an image forming section 213, where it receives an image, and then, it is fixed in a fixing section 214. Thereafter, it is sent straight through a folding apparatus, which normally is not activated, to the sheet entrance 215 of the stapling-stacking apparatus 205.

At this time, the image forming process of the copying machine 200, which is the mother machine for the sheet processing apparatus, will not be described since it is public knowledge.

Figure 2:
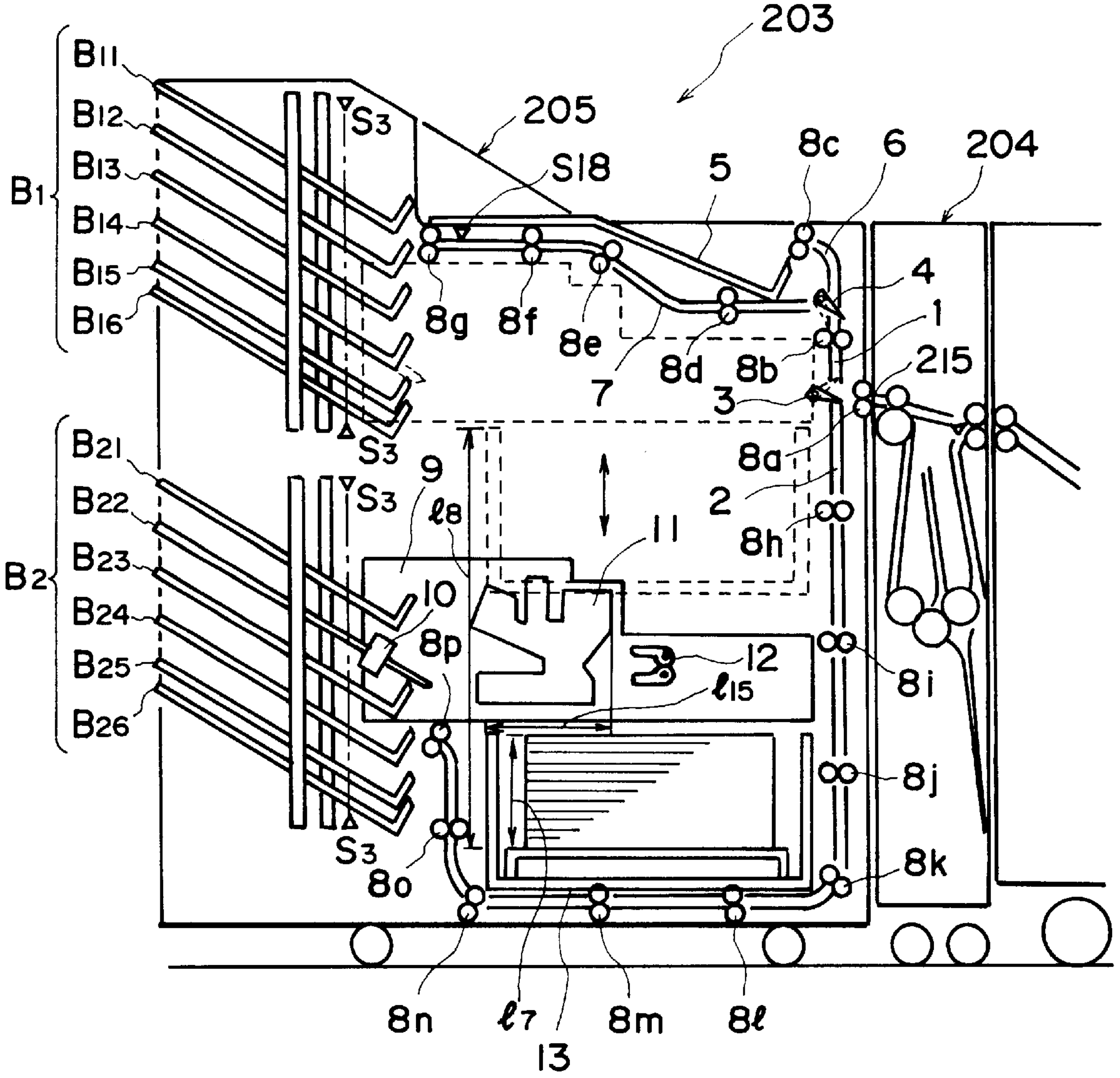
FIG. 2 is a schematic front view of a post-image formation sheet processing apparatus in the first embodiment of the present invention.

Referring to FIGS. 1 and 2, the stapling-stacking apparatus 205 comprises bin modules B1 and B2, being arranged in the vertical direction. The bin module B1 comprises a plurality of bins B11–B1*n*, and the bin module B2 also comprises a plurality of bins B21–B2*n* (in the drawings, n=6). The bin modules B1 and B2 can be independently moved to dispose one of its own bins at a sheet receiving position or a sheet set transferring position, and also, the bin intervals and bin position in each bin module can be varied.

There are two sheet delivery paths, the first sheet delivery path 1 that leads upward and the second sheet delivery path 2 that leads downward, which branch out from the sheet entrance 215. The sheet advancing direction is switched at the sheet entrance 215 by a deflector 3 driven by a unillustrated solenoid SL3. The first path 1 branches into a sheet delivery path 6 leading to a non-sort tray 5 and a sheet delivery path 7 leading to a top module B1, at the location of a deflector 4 driven by a unillustrated solenoid SL4. The second path 2 serves by itself as the path to a bottom module B2. The sheet to be delivered to the non-sort tray is conveyed by roller pairs 8*a*, 8*c* and 8*c*; the sheet to be delivered to the top module, by roller pairs 8*a*, 8*b*, and 8*d*–8*g*; and the sheet to be delivered to the bottom module is conveyed by roller pairs 8*a*, and 8*h*–8*p*.

The stapling-stacking apparatus comprises a gripping-stapling unit 9, which is disposed in a space formed between the path to the top module and the path to the bottom module, wherein the sheet set on each bin is moved rightward (in FIGS. 1 and 2) by an edge advancing gripper 10, is selectively stapled by a stapler 11, and then, is moved further rightward by a transfer gripper 12 that grips the edge of the sheet set.

Also in the same space between the path to the top module and the path to the bottom module, a stacking unit 13 waits below the gripping-stapling unit 9, and stores the sheet set transferred thereon by the transfer gripper 12.

Referring to FIG. 2, the right end portion of the stapler 11 and the left end portion of the stacking unit 13 overlap (by a length designated by l15) in the horizontal direction.

After the bin B11–B16 of the top module are filled with a set of sheets, the gripper-stapler unit 9 is moved to a position indicated by a broken line in FIGS. 1 and 2 to transfer the sheet set out of the bins. While the sheet sets are transferred from the top module, the sheet is delivered to the bins B21–B26 of the bottom module. After the completion of both the sheet set transfer from the bins B11–B16, and the sheet delivery to the bins B21–B26 of the bottom module, the sheet sets are transferred from the bottom module at a position indicated by a solid line in FIG. 2. This operation can be repeated to continue the copying operation till the stacking unit becomes full.

Hereinbefore, the general structure of the apparatus was described, and hereinafter, the detailed structure of each section will be described.

The folding apparatus mentioned in the above description is the same as the one disclosed in Japanese Laid-Open Patent Application Nos. 232,372/1986 or 59,002/1987; therefore, its description will be omitted here.

Figure 3:
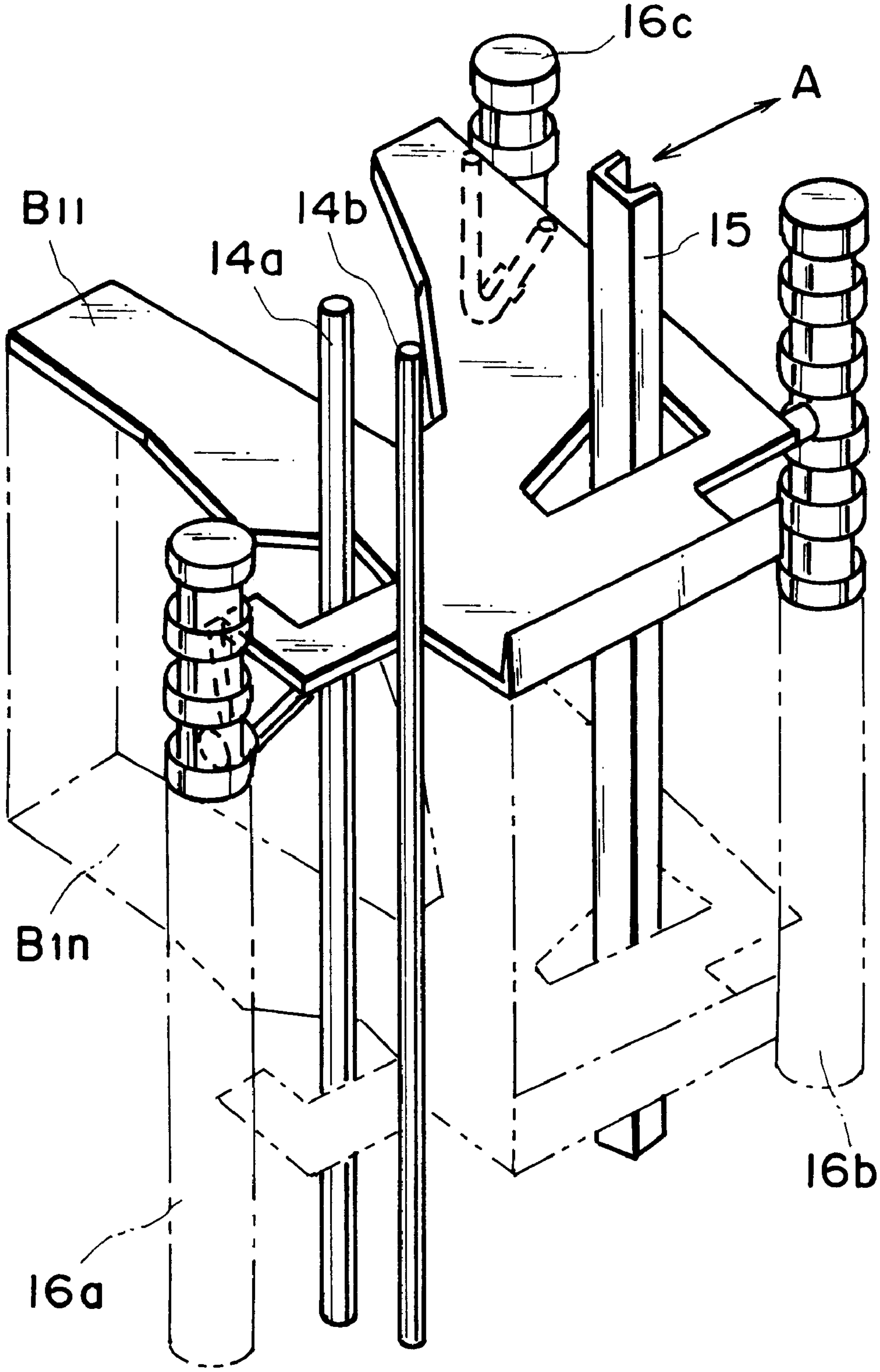
FIG. 3 is a perspective view of a bin module.

To begin with, the bin modules B1 and B2 will be described. FIG. 3 is a perspective view of the bin module. Below, the description will be given with reference to the module B1, and the same structure applies to the bin module B2.

The bin module B1 essentially comprises bins B11–B1*n*, two reference rods 14*a* and 14*b*, an aligning wall 15, lead cams 16*a*–16*c* for moving vertically the bins, and driving sections therefor. The reference rods 14*a* and 14*b* are the members that define the referential line for the sheet discharged onto the bin when the post-image formation sheet processing such as stapling is carried out, and normally, it is disposed at a location retreated slightly from the point where the edge of the discharged sheet settles. The aligning wall 15 comes in contact with the edge of the sheet discharged onto the bin, and shifts the sheets in the direction perpendicular to the sheet delivery direction (direction indicated by an arrow mark A), one by one, or by two or more, whereby the sheet is aligned as the sheet edge opposite to the aligning wall 15 is abutted on the reference rods 4*a* and 4*b*.

Figure 4:
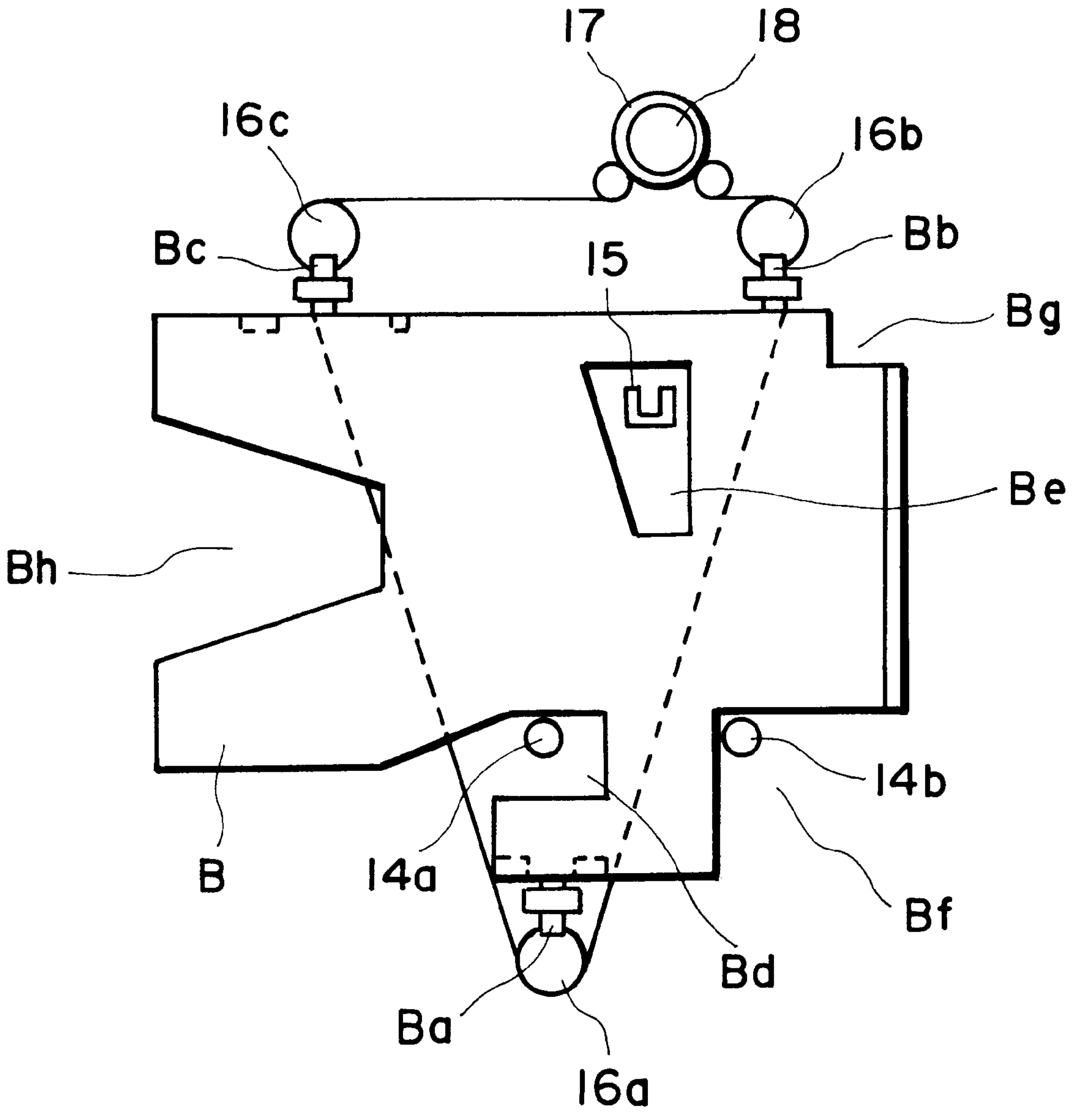
FIG. 4 is a plan view of the bin module.

Referring to FIG. 3, and FIG. 4, which is a plan view of the bin module, the lead cam 16*a*, or 16*c* is a spiral cam, the peripheral surface of which is provided with a spiral cam surface, wherein the lead cam 16*a* is disposed at the front, and the lead cams 16*b* and 16*c* are disposed at the rear. Each cam engages with correspondent roller Ba, Bb or Bc projecting from the bin; therefore, synchronous rotations of the lead cams vertically move the bins by a predetermined pitch.

Referring to FIG. 4, the bin has a cutaway portion Bd correspondent to the reference rod, a hole Be correspondent to the aligning wall, a cutaway portion Bf correspondent to the gripper, which will be described later, a cutaway portion Bg correspondent to the driving mechanism for the vertical portion of the bin, and a cutaway portion Bh needed operationally.

Figure 5A:
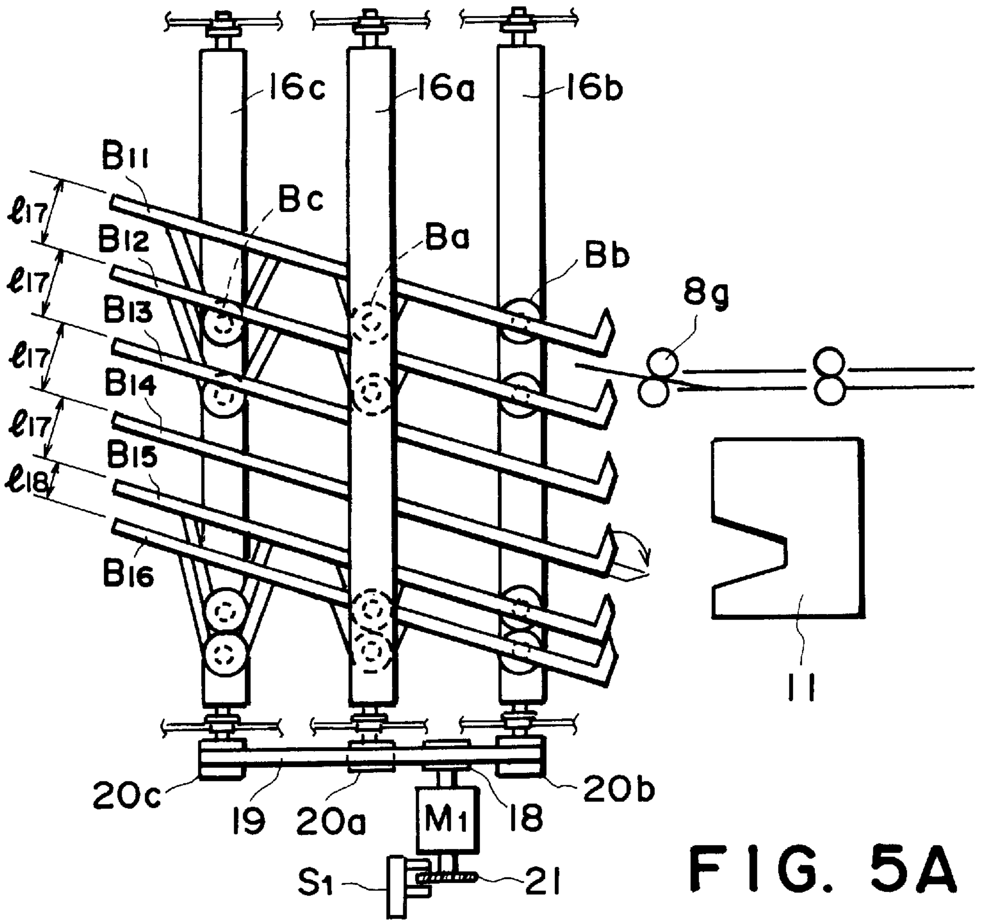
FIGS. 5(*a*), and 5(*b*) are a front view of the bin module, and a front view of a comparative bin module.
Figure 5B:
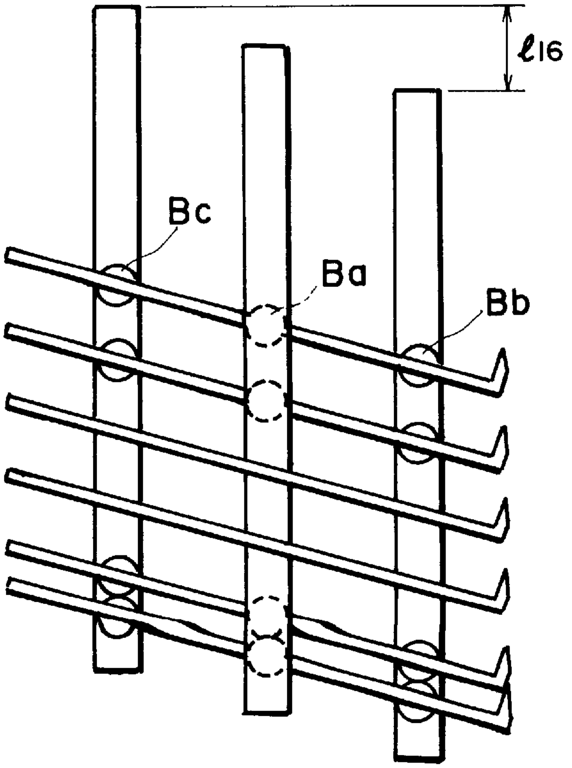

FIG. 5 is a front view of the bin module. In the drawing, the bins are vertically stacked in parallel, being slightly angled relative to the horizontal plane, whereas the bin rollers Ba, Bb and Bc are at the same height. More specifically, the position of the bin roller Bb attached toward the right end portion of the bin is next to the referential surface of the bin, whereas the position of the bin roller Bc attached toward the left end portion of the bin, using a V-shaped fixing arm, is substantially below the referential surface of the bin. With this arrangement, even when the adjacent bins come extremely close to each other as the bins B15 and B16 do in FIG. 5, the interference between the arms can be avoided. Further, the bin rollers Ba, Bb and Bc are all at the same height; therefore, the lead cams 16*a*, 16*b* and 16*c* can all be positioned at the same height, which allows the reduction in the overall size of the apparatus. In other words, in comparison with an arrangement illustrated in FIG. 5(*b*), in which the rollers Ba, Bb and Bc are positioned right next to the referential surface of the bin, the arrangement in this embodiment can reduce the overall apparatus size by an equivalence of $1_{16}$ in FIG. 5(*b*).

Figure 6:
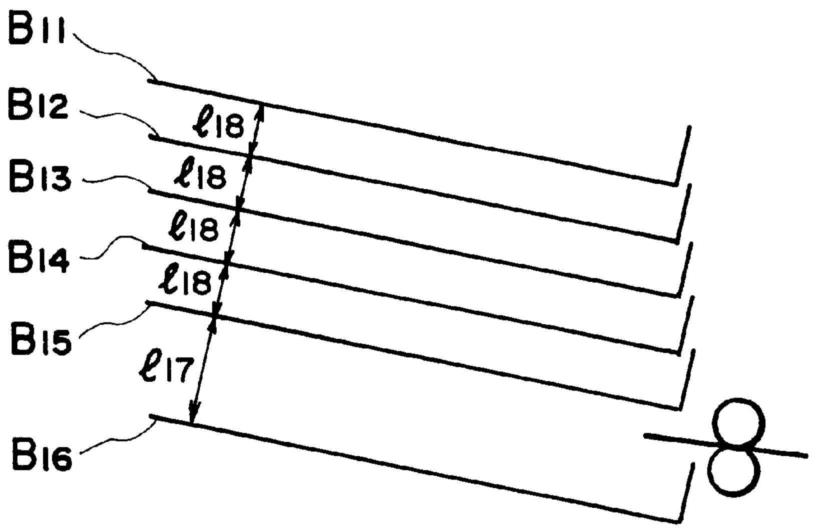
FIG. 6 is a schematic drawing for depicting a state of the bins.

Next, referring to FIG. 5, a description will be given as to the bin intervals. FIG. 5 depicts the top bin module B1, wherein the second bin B12 from the top is disposed at a location correspondent to the discharge roller pair 8*g* and receives the discharged sheet, whereas the fourth bin B14 from the top is disposed at the sheet set transfer location, to which the bins are sequentially shifted to transfer the sheet set, after the completion of the sheet delivery to the bin module. In FIG. 5, the bin intervals among the bins B11–B15 are l17, which is relatively large, and only the bin interval between the bins B15 and B16 is l18, which is relatively small, but the bin interval varies depending on the operational situation. For example, in FIG. 6, the bin B16 is at the sheet receiving position, with the bins having been moved to the uppermost position, and at this time, the bin intervals among the bins B11–B16 are l18, being relatively small, and only the interval between the bins B15 and B16 is l17, being relatively large.

Figure 7:
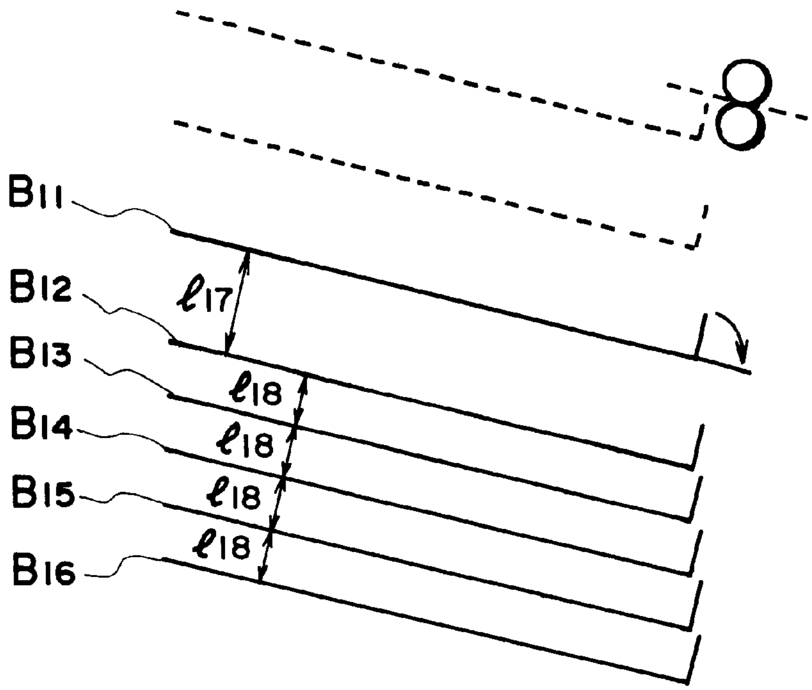
FIG. 7 is a schematic drawing for depicting another state of the bins.

In FIG. 7, the bin B11 is at the sheet set transfer position, with the bins having moved to the bottommost position, and at this time, only the interval between the bins B11 and B12 is l17, being relatively large, with others being relatively small l18. In other words, the interval between the bin at the sheet receiving position and the bin directly above needs to be approximately l17, and the intervals between the bin at the sheet set transfer position and the bins directly above and below need to be approximately l17, that is, the intervals between bins B11 and B12, between B13 and B14, and between B14 and B15, in FIG. 5. In FIG. 5, the interval between bins B12 and B13 is also relatively large. Functionally, however, this interval may be as small as l18, and the size of this interval is determined depending on the relationship between the space occupied by the upper half of the stapler 11 and the bin interval.

On the other hand, in the case of the bottom bin module, the relation between the sheet receiving position and sheet set transfer position is opposite to the one in the top module as is evident from the FIGS. 1 and 2. Therefore, following the same chain of thought, in FIG. 2, the interval between the bins B24 at the sheet receiving position and bins B23 directly above needs to be approximately l17, being relatively large, and the intervals between the bin B22 at the sheet set transfer position and the bins B21 and B23 directly above and below, respectively, also need to be approximately l17, whereas the interval between the bins B24 and B25 does need not be approximately l17. However, when the interval between the bins B24 and B25 is also increased to approximately l17, the bin interval arrangement becomes identical for the top and bottom bin module, admitting that the relation between the sheet receiving position and sheet set transfer position is reversed; in other words, the lead cam pitch that determines the bin interval may be the same for the top and bottom bin modules, which offers such a merit that a common lead cam can be used for the top and bottom bin modules. Further, there is another merit offered by the reversal arrangement of the sheet receiving position and sheet set transfer position between the top and bottom bin modules, that is, the same gripping-stapling unit 9 and stacking unit 13 are shared by the top and bottom bin module when the sheet is taken out.

Next, the bin shifting mechanism and its operation will be described (FIGS. 4 and 5).

The driving force from a bin shift motor M1 is synchronously transmitted to the lead cams 16*a*–16*c* by way of a motor pulley 18, a belt 19, and lead cam pulleys 20*a*–20*c*, wherein as the lead cam is rotated one rotation by the forward or backward rotation of the motor M1, the bins are vertically shifted by the amount equivalent to the cam pitch. Each lead cam is rotatively supported by its own bearing, and receives the driving force through the pulley 20 attached thereto, at the end opposite to the bearing. The bin shift motor 17 has an encoder 21 disposed on the side opposite to the pulley 18, and the number of rotations is detected by a sensor S1.

Each bin module has a home position detecting sensor S2 (unillustrated), which determines whether or not the uppermost bins B11 or B21 of the top or bottom bin module, respectively, is at the correspondent sheet receiving position. Each bin module also has a penetration type sensor S3 (FIG. 2) for detecting the sheet on the bin, and the signal from this sensor is used for determining the timing for switching the modules or the like purpose.

Figure 8:
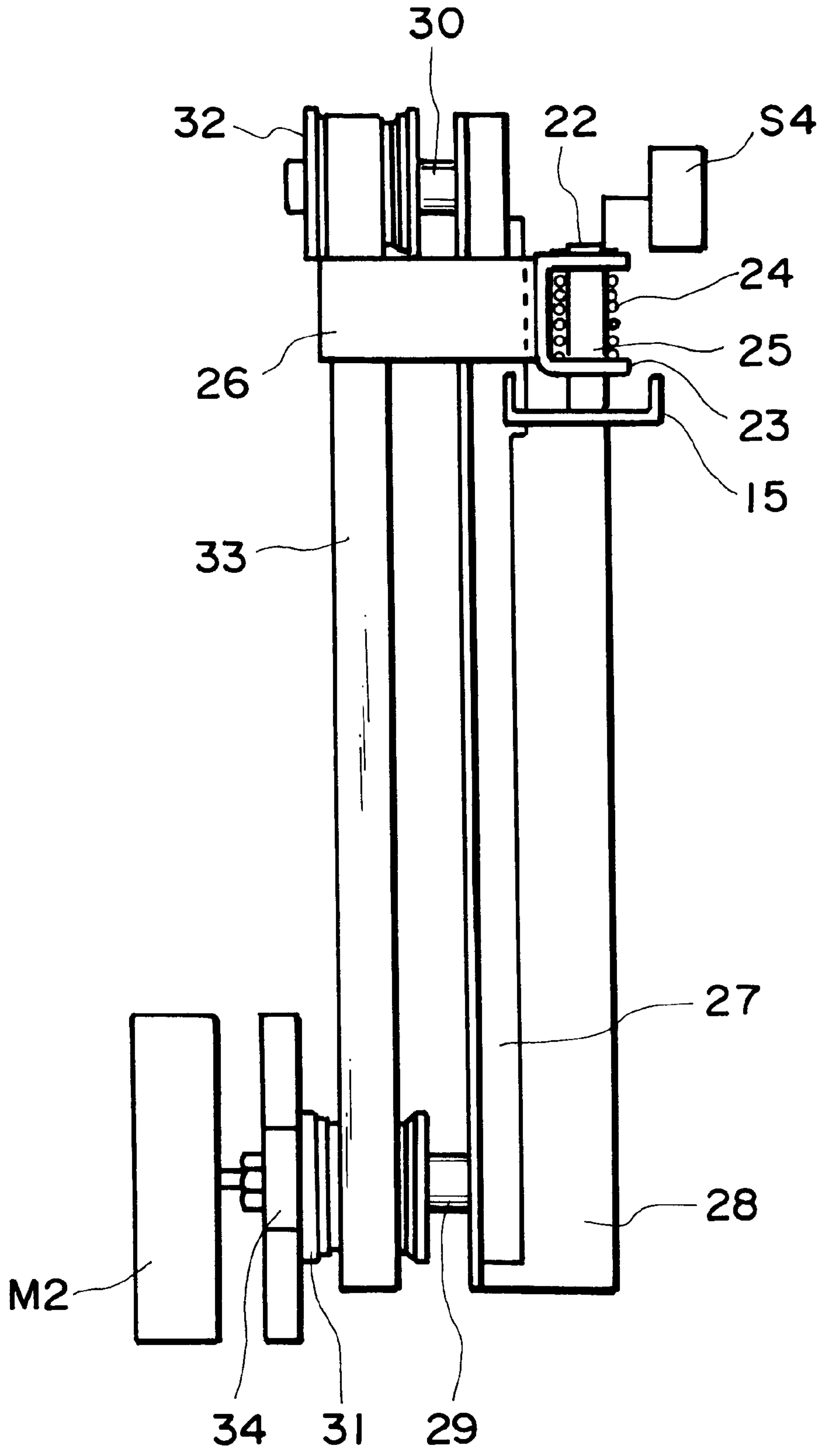
FIG. 8 is a plan view of an aligning section.
Figure 9:
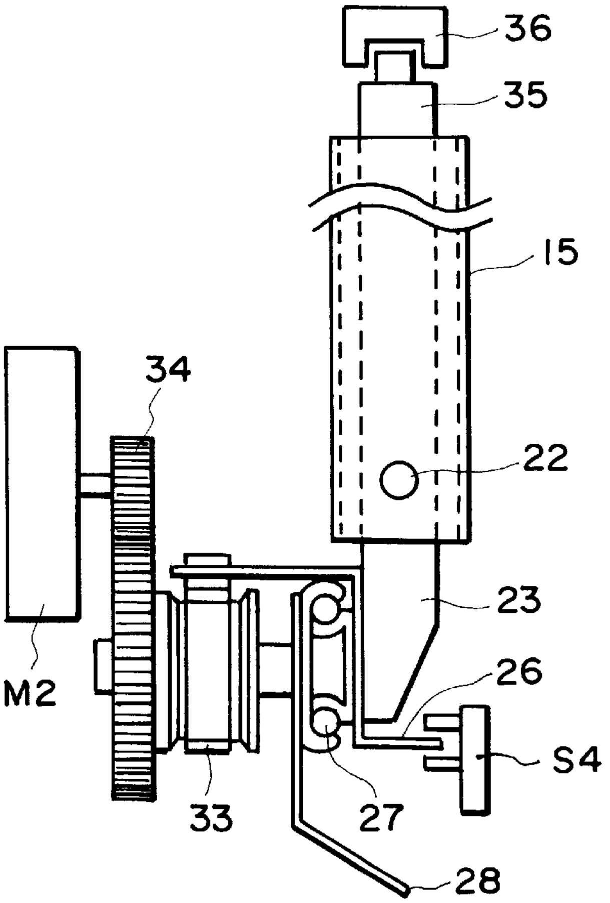
FIG. 9 is a front view of the aligning section.

Next, the driving mechanism for the aligning wall that aligns the sheet on the bin will be described referring to FIG. 8, a plan view, and FIG. 9, a front view.

The aligning wall 15 has a shaft 22, which is put through a U-shaped supporting plate 23 and attached to the aligning wall by crimping. In the inner side of the U-shaped plate 23, a compression spring 24 is placed in a state of being slightly compressed, wherein one end of it presses on the inner wall of the plate 23 and the other end abuts on a stopper 25 of the crimped shaft 22. With this arrangement, the crimped shaft 22 and aligning wall 15 are under the downward pressure generated by the compression spring.

The bottom side of the U-shaped supporting plate 23 is fixed to the moving side of the ACCURIDE 27, with the use of a slide plate 26. The fixed side of the accuride is fixed to an ACCURIDE rail plate 28 which extends in the sliding direction of the aligning rod. On the ACCURIDE rail plate, a front shaft 29 and a rear shaft 30 are erected and secured by crimping, and a pulley gear 31 and a pulley 32 are rotatively mounted thereto, respectively. Across the pulleys 31 and 32, a timing belt 33 is stretched, and the slide plate 26 is fixed to the belt 33. The driving force is transmitted as the motor gear of an aligning wall driving motor M2 engages with the gear portion of the pulley gear 31. The home position of the aligning wall is detected by a sensor S4. Above the U-shaped supporting plate, a slide member 35 is attached, which fits in the groove of a fixed rail 36, being guided thereby. Referring to FIG. 9, the driving force is transmitted from underneath, and the upper portion is guided by the rail, but this arrangement may be reversed. Further, the aligning wall structure and the power transmission thereto may be reversed between the top and bottom modules.

Figure 10:
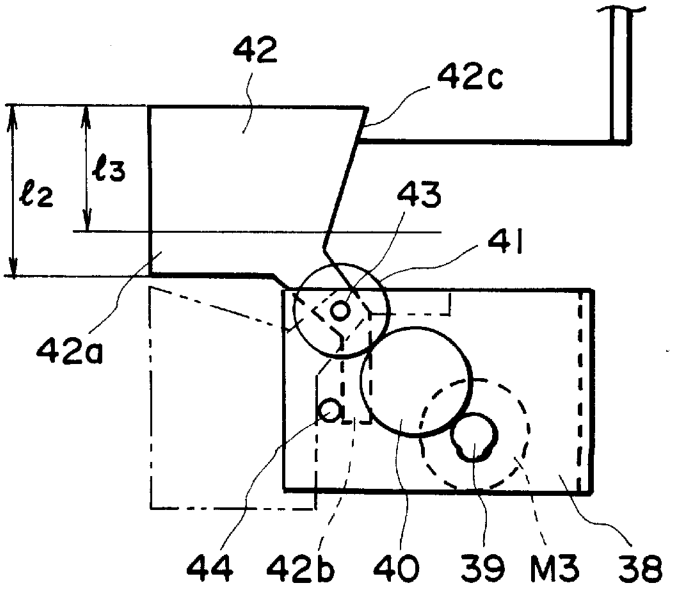
FIG. 10 is a plan view of a folded sheet guiding member.
Figure 11:
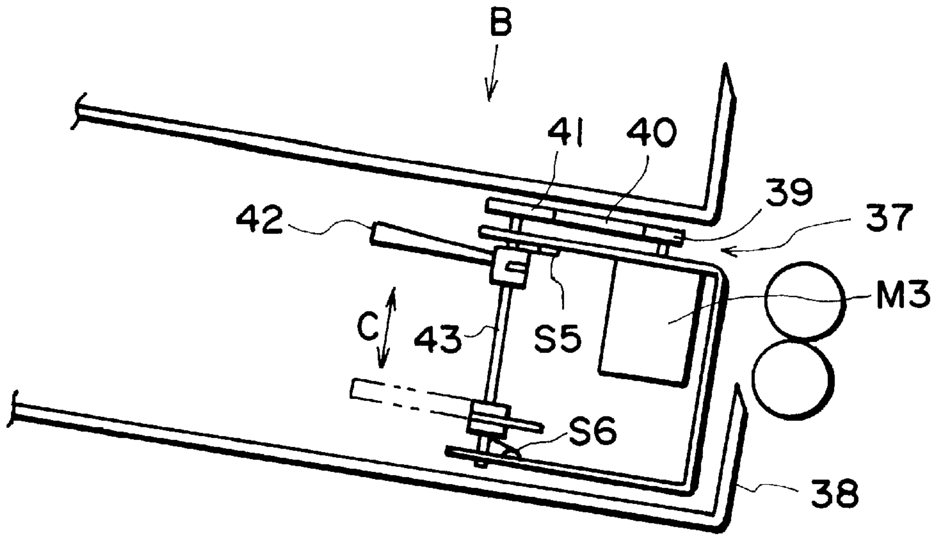
FIG. 11 is a front view of the folded sheet guiding member.

Next, referring to FIGS. 10, 11 and 12, a guide member will be described regarding its structure, and its operation during the accumulation of folded sheets, wherein FIG. 11 is a front view; FIG. 10 is a side view seen front the direction indicated by an arrow mark B in FIG. 11; and FIG. 12 is a schematic drawing to depict the operation.

Referring to FIG. 11, a guide unit 37 occupies a space approximately equivalent to the bin interval. In the guide unit 37, a guide moving motor M3 is mounted on a U-shaped base 38, and as a motor gear 39 is rotated by the motor M3, the driving force is transmitted, through gears 40 and 41, to a ball screw 43 serving as the shaft of a guide 42 for folded sheet. The folded sheet guide 42 is a member having a configuration illustrated in FIG. 10. It comprises a guiding portion 42*a* and a stopper portion 42*b*, and is engaged with the ball screw 43, wherein the guiding portion 42*a* and stopper portion 42*b* are on the opposite side of each other relative to the rotational center of the folded sheet guide 42. Referring to FIG. 10, the folded sheet guide 42 is moved about the ball screw 43 approximately 90° between a retracted position indicated by a double dot chain line and a sheet guiding position indicated by a solid line. When the folded sheet guide 42 is rotated clockwise, a stopper portion 42*b* comes in contact with a stopper pin 44 projecting from the base 38, and when it is rotated counterclockwise, the guide portion 42 comes in contact with the stopper pin 44. The hole of the folded sheet guide 42, through which the ball screw 43 is put, is threaded to be meshed with the ball screw 43. When the folded sheet guide 42 is not in contact with the stopper pin 44, it rotates with the ball screw 43 till it comes in contact with the stopper pin 44. However, as the ball screw 43 is further rotated after the guide 42 contacts the stopper bin 44, and the guide 42 this time is moved in the direction of arrow mark C in FIG. 11, remaining in contact with the stopper pin 44. In other words, referring first to FIG. 10, as the motor M3 is rotated forward, the folded sheet guide 42 at the retracted position indicated by the double dot chain line is moved clockwise to the receiving position indicated by the solid line, and referring next to FIG. 11, as the motor M3 is further rotated, it is lowered from a solid line position to a broken line position, where the rotational direction of the motor M3 is reversed. Then, the folded sheet guide 42 is rotated counterclockwise fruit the receiving position indicated by the solid line in FIG. 10 to the retracted position indicated by the double dot chain line in FIG. 10, and as the motor M3 is further rotated, it is raised from the broken line position to the solid line position in FIG. 11.

The function of the folded sheet guide 42 will be described referring to FIG. 12(*a, b*).

Figure 12A:
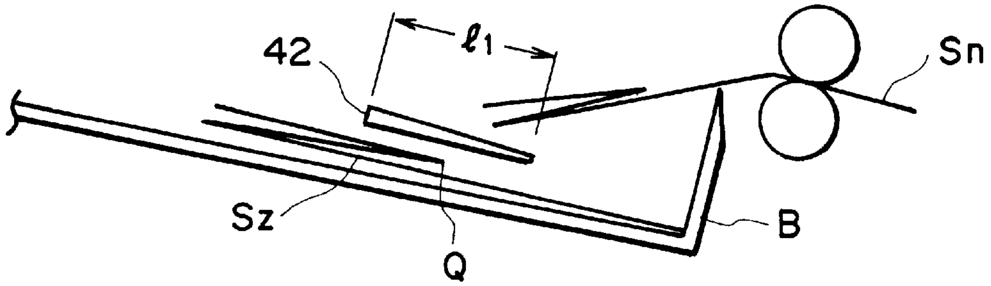
FIGS. 12(*a*) and 12(*b*) are a state of the folded sheet guiding member, and another state of the same.
Figure 12B:
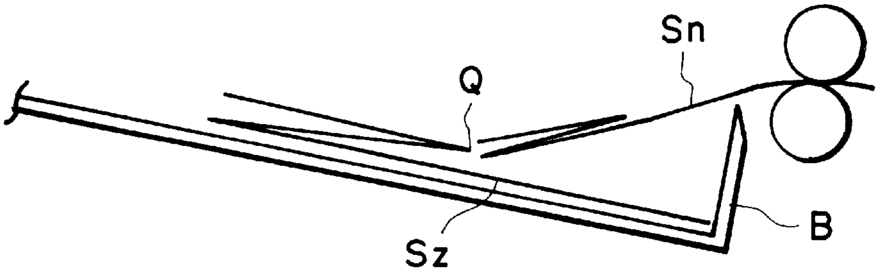

The folded portion Q of a Z-folded sheet Sz having been accumulated on a bin B is located at an approximately middle portion of the bin relative to the sheet delivery direction; therefore, when the next folded sheet Sn is discharged, its leading end might collide with the folded portion Q as illustrated in FIG. 12(*b*), which might disturb the accumulated sheets. However, in this embodiment, the folded sheet guide 42 is moved above the folded portion Q and is extended over the sheet; therefore, the leading end of the next folded sheet Sn can be guided by the folded sheet guide 42 so as not to disturb the accumulated sheets. After the next sheet is deposited, the folded sheet guide is prepared for the next folded sheet. First, it is rotated in parallel to the sheet accumulating surface in order to move it out of the sheet delivery path, and then, is raised above the highest point of the last accumulated folded sheet. Next, it is dispatched over the accumulated sheets, and then, is lowered to a predetermined level. As the number of the accumulated folded sheets increases, the highest portion of the accumulated folded sheet comes in contact with the bottom surface of the folded sheet guide 42. This state of contact is permissible to a certain point. In other words, there may be a slight gap between the bottom surface of the folded sheet guide and the highest point of the accumulated folded sheet, or both may be in contact, with a gentle contact pressure. As for the width of the guide member 42 (length l1 in FIG. 12), it Is preferable for the guide member 42 to be wide enough to cover the folded portion regardless of the folded sheet size so that the folded sheet of different type or size can be dealt with by a single guide member. Needless to say, the wider guiding width may be provided by a plurality of guides.

As for the guide member depth (length l2 in FIG. 10), it is preferable to be as long as possible. This is because when the following discharged folded sheet can be guided across the entire length of the folded portion of the previously discharged sheet, there will be no chance that the following folded sheet collides with the folded portion of the preceding sheet. However, when the requirement for the guide retraction and overall size of the apparatus are taken into consideration, it is preferable for the guide member size to be as small as possible. According to experiments, the guiding member can effectively function as long as the distance from the edge of the discharged folded sheet l3 in FIG. 10) is 15 mm or so. Therefore, when two guiding members are provided, one at the front and another at the rear, so that the following sheet is guided by the width of approximately 15 mm from the sheet edge, at the front and rear, the folded sheets can be more smoothly accumulated.

Next, the configuration of the guide 42 will be described.

Referring to FIG. 10, an upstream side edge 42*c* of the guide 42 relative to the sheet delivery direction is angled as shown in the drawing; in other words, the guide 42 is tapered in toward the sheet edge. Normally, the edge 42*c* is on the upstream side of the landing spot of the leading end of the following sheet, wherein even when the leading end lands close to the edge 42*c* due to an abnormal situation such as an occurrence of unusual curling, this slant of the edge 42 reduces the possibility that the edge 42*c* hooks the leading end of the sheet.

As for the thickness of the guide 42, its thickness is reduced toward the upstream side of the sheet delivery direction, as is depicted by the sectional view of the raised guide 42 in FIG. 11 (solid line). In other words, its thickness is smallest at the edge 42*c*, the most upstream portion. Therefore, the interval between the bins can be most efficiently used to accumulate the folded sheet.

Referring again to FIG. 11, an upper limit switch S5 and a lower limit switch S6 are mounted on the base 38 in order to detect the raised and lowered positions of the guide 42*a*, respectively, and the rotational direction of the motor M3 is reversed when these switches are activated.

Figure 13:
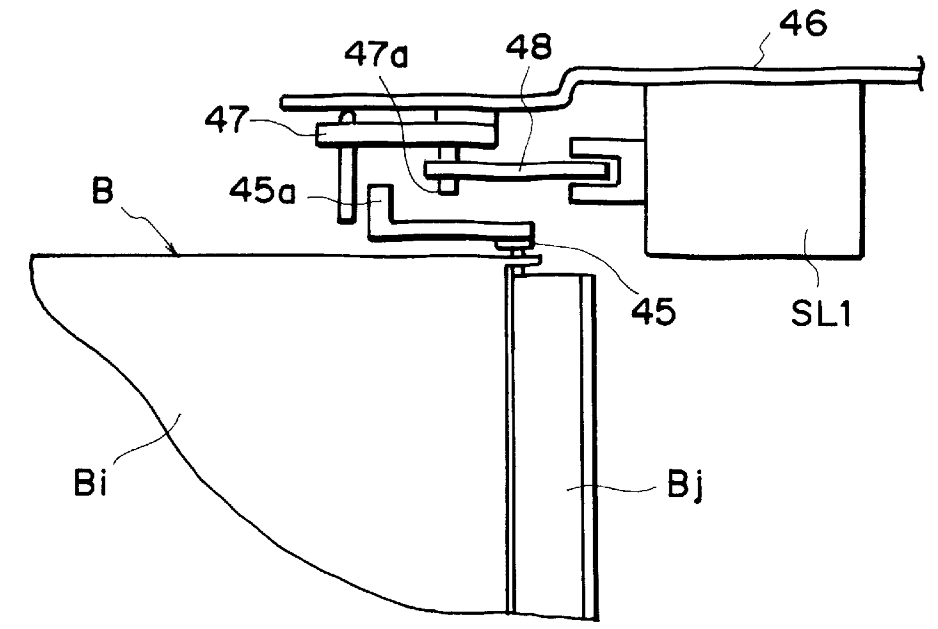
FIG. 13 is a plan view of the driving section for an upright portion of the bin.
Figure 14:
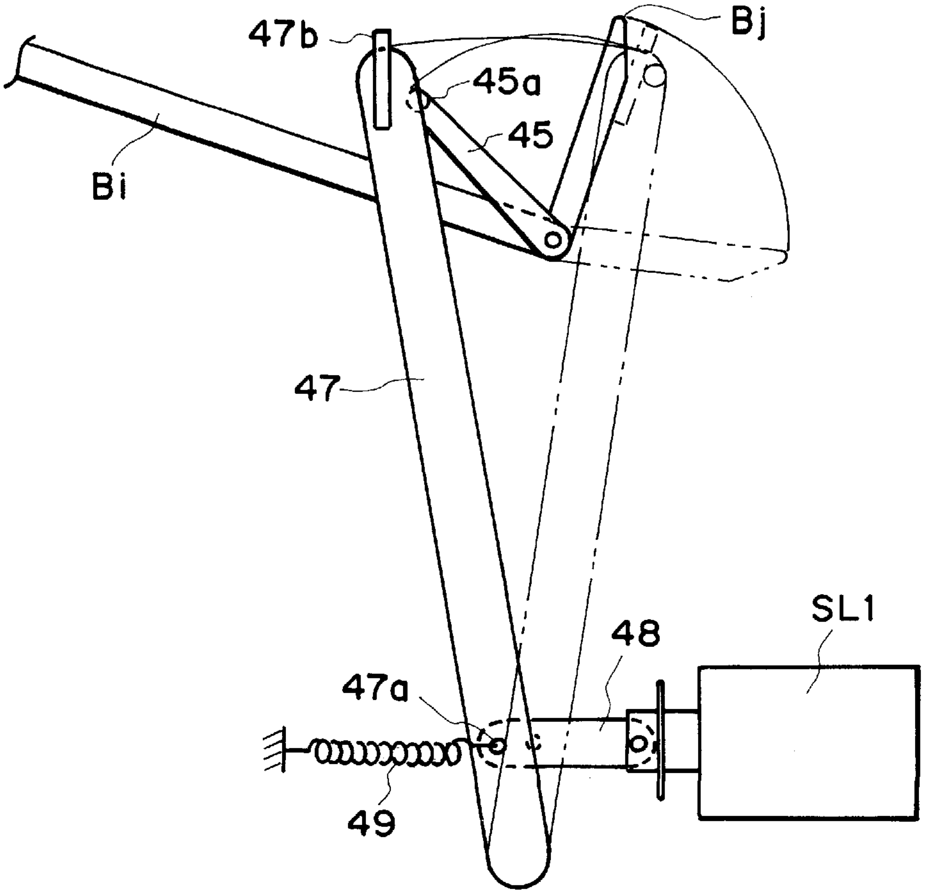
FIG. 14 is a front view of the driving section for the upright portion of the bin.

Next, the driving mechanism for the upright portion of the bin will be described. This upright portion of the bin serves as the aligning surface in the sheet delivery direction (FIGS. 13 and 14).

This driving mechanism moves the upright portion of the bin when the sheet set accumulated on the bin must be moved past the location of the upright portion of the bin in order to process or stack it. FIG. 13 is a plan view and FIG. 14 is a front view.

The bin B comprises a sheet accumulating portion Bi and a aligning portion Bj, wherein the rotational axis of the aligning portion Bj is rotatively fitted in the hole in the accumulating portion Bi side. As for the rotational angle, it is approximately 90° as illustrated in FIG. 14; in other words, the aligning surface perpendicular to the fixed accumulating surface can be rotated to become substantially level with the accumulating surface. Normally, the aligning portion Bj is placed under a pressure from a spring or the like so that the accumulating surface and aligning surface remain perpendicular to each other (solid line in FIG. 14). The spring is strong enough to prevent the aligning portion Bj from being pushed down by the weight of the sheet set on the bin. Further, on the rear side of the aligning portion Bj, a driving arm 45 is attached, and a pin 45*a* projects from the free end of the driving arm.

A solenoid SL1 for driving the upright portion of the bin is supported on a base 46. On the base 46, a link 47 is rotatively supported, and one end of an arm 48 is engaged with the pin 47*a* of the link 47. The other end of the arm 48 is attached to the solenoid SL1, and the link 47 is moved from a solid line position to a double dot chain line position by the solenoid activation. At the free end portion of the link 47, a contact member 47*b* is attached, wherein normally, there is an enough gap between the contact member 47*b* and the pin 45*a*, so that the vertical movement of the bin B is not interfered with. When the sheet set is stacked after the completion of the sheet discharge onto the bin and the subsequent processing of the sheet set in the bin, the involved bin is shifted to a position illustrated in FIG. 14, and then, the solenoid SL1 is activated. The bin contact member 47*b* comes in contact with the pin 45*b*, and as the link 47 further rotates, the aligning portion Bj is moved to the double dot chain line position in FIG. 14. When the solenoid SL1 is deactivated, the link 47 returns to the solid line position by the function of a spring 49, allowing thereby the aligning portion Bj to return to the position where it becomes perpendicular to the sheet accumulating surface.

Figure 15:
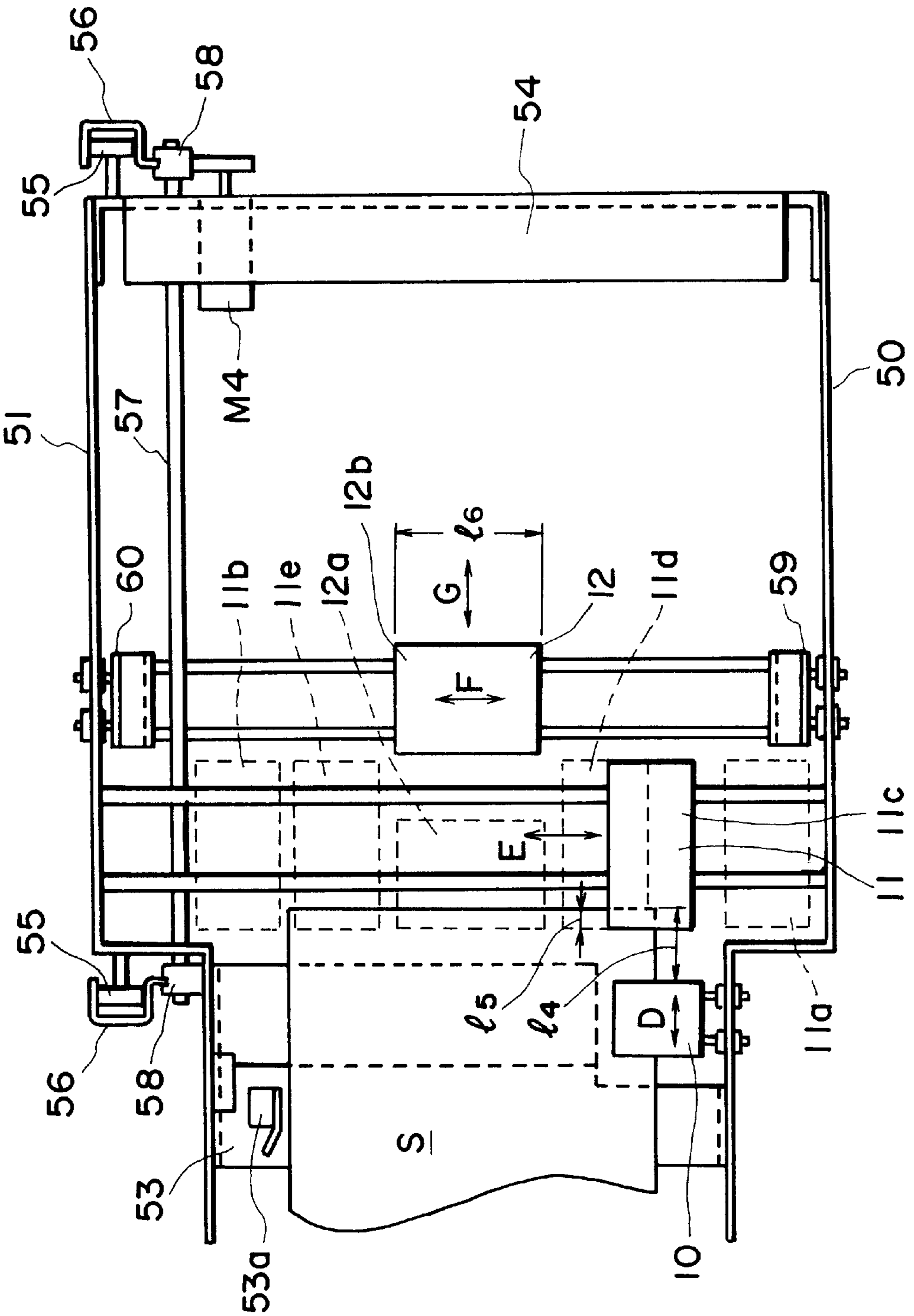
FIG. 15 is a plan view of a gripper-stapler combination unit.
Figure 16:
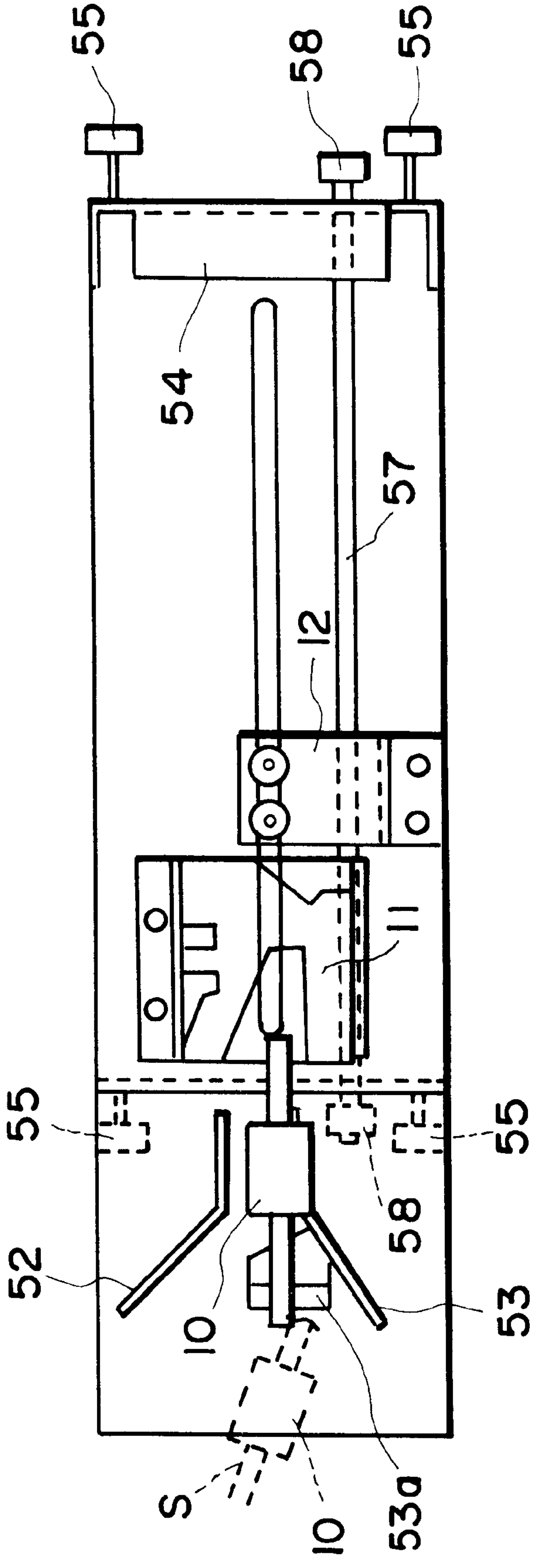
FIG. 16 is a front view of the gripper-stapler combination unit.

Next, the gripping-stapling unit 9 will be described (FIGS. 15 and 16).

FIG. 15 is a plan view and FIG. 16 is a front view.

As for its general structure, guide stays 52 and 53, and a right stay 54 are bridged between a front plate 50 and a rear plate 51, forming thereby the unit frame. To this frame, a total of four rollers 55, two on the left rear and two on the right rear, are attached by crimping. On the rear side of the bottom guide stay 53, a member 53*a* for guiding the sheet sets when the sheet set is transferred is fixed. The four rollers are guided by two rails fixed to the main frame of the apparatus. On each rail, a rack is cut across the length of the rail 56, and this rack meshes with a pinion gear 58 mounted at on end of a shaft 57 that penetrates across the frame. As the driving force is transmitted from the vertical movement motor M4 to the pinion gear 58, the whole frame is vertically moved.

There are three moving members within the frame. The edge advancing gripper 10 can be moved in the direction of an arrow D in FIG. 15, and it grips the right end portion of the sheet set S, on the front reference side, and advances the sheet to the rightward direction. A distance l4 between the right edge of the edge advancing gripper 10 and the advancing end of the sheet set S is set to be longer than a distance l5 between the left edge of the stapler 11 and the advancing end of the sheet set S. The stapler 11 can be freely moved in the direction of an arrow mark D to a retracted position in front or to a retracted position at the rear, both of which are off the sheet path.

The transfer gripper 12 is movable in the direction of an arrow mark F in FIG. 15, and is also movable together with the front and rear plates 59 and 60 in the direction of an arrow mark G. It is moved in the arrow mark F direction depending on the sheet size so that it grips the sheet set by a substantially middle portion in the width direction, and then, it pulls the sheet set completely away from the bin in order to transfer the sheet set onto the stacker, which will be described later. The movement of the gripper 12 in the arrow F direction is used not only for adjusting the gripping location depending on the sheet size, but also for separating the sheet sets on the stacker. More specifically, when the sheet set is transferred onto the stacker, the distance the transfer gripper 12 is moved in the arrow mark G direction is dependent on the sheet size, but if at this time, the distance it is moved in the arrow mark F direction is varied, a plurality of sheet sets having the same size can be separated from each other, or a group of sheet sets belonging to one copying operation can be separated from another group of sheet sets belonging to the other copying operation. A length l6, that is, the gripper 12 measurement in the depth direction of the apparatus, ; set to be such that even when the stapler 11 is at a position where the stapler works on the sheet set S, the gripper 12 can hang onto the leading end of the sheet set S.

Below, the moving members 10, 11 and 12 in the gripping-stapling unit 9 will be described in detail.

Figure 17:
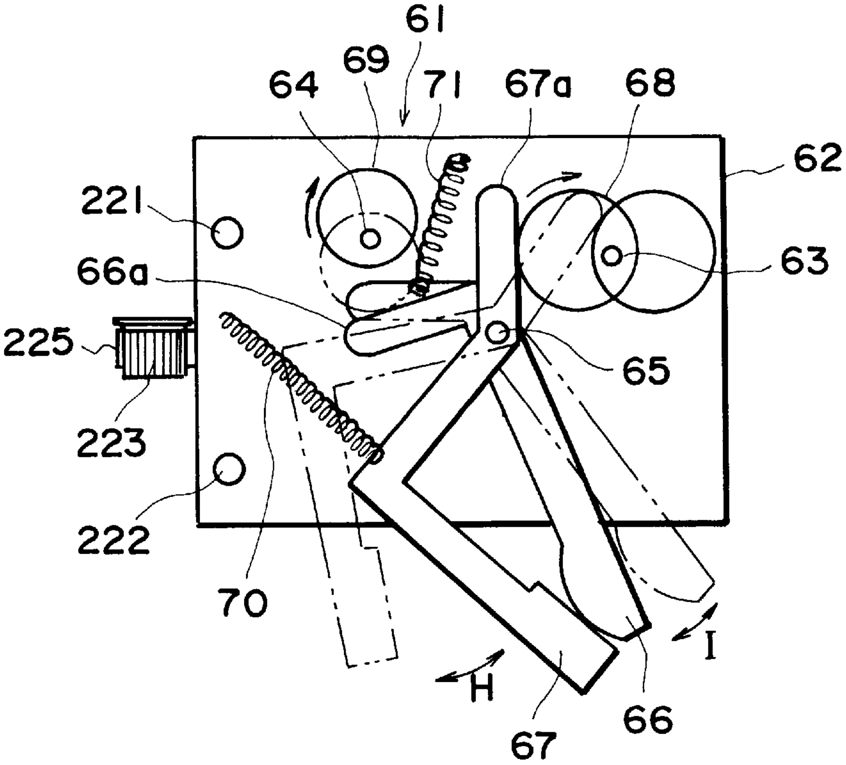
FIG. 17 is a structural drawing of the gripper section.

First, the portion that grips the sheet set will be described. The structure of the gripping portion is common for the edge advancing gripper 10 and transfer gripper 12 (FIG. 17).

Three axes 63, 64 and 65 are supported on the side plates 62 and 62. Both of the top and bottom pieces 66 and 67 of the gripper are mounted on the axis 65. When a bottom piece cam 68 fixed to the axis 63 and a top piece cam 69 fixed to the axis 64 are rotated in the direction of arrow marks, the bottom and top pieces are oscillated in the directions of arrow marks H and I, respectively (solid line and broken line). A spring member 70 pulls the cam portion 67*a* of the bottom piece 67 toward the bottom piece cam 68, and a spring member 71 pulls the cam portion 66*a* of the top piece 66 toward the tip piece cam 69, wherein the contact pressure between the top and bottom pieces of the gripper is controlled to remain substantially constant. The top and bottom piece cams are driven by unillustrated motors M5 (edge advancing gripper) and M6 (transfer gripper).

As described above, the basic structure is the same for the edge advancing gripper 10 and transfer gripper 12, wherein gripper characteristics such as the gripping pressure, gripping width, maximum opening distance or the like may be optimally selected according to the conditions under which the apparatus is used. For example, in this embodiment, the edge advancing gripper is given a small width because of the available space and grips only the reference side; therefore, the gripping pressure is increased to prevent the shifting of the sheet sets, and the maximum opening distance is kept on the smaller side to allow the gripper to advance into the bin intervals. On the other hand, the transfer gripper can grip the center portion of the sheet set; therefore, the gripping pressure may be set to be relatively low. Further, they may be set to meet a commonly used standard according to the amount of sheet curl, basis weight, presence or absence of folded portion, number of sheets, or the like.

Figure 18:
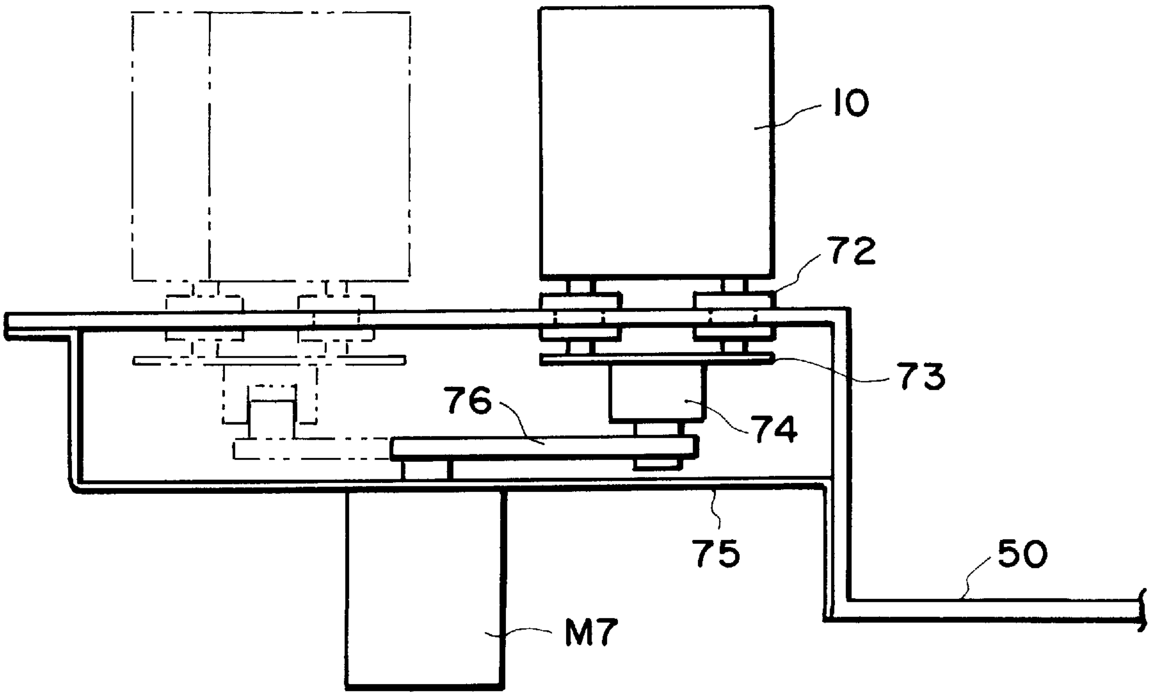
FIG. 18 is a plan view of the driving mechanism for a sheet set edge advancing gripper.
Figure 19:
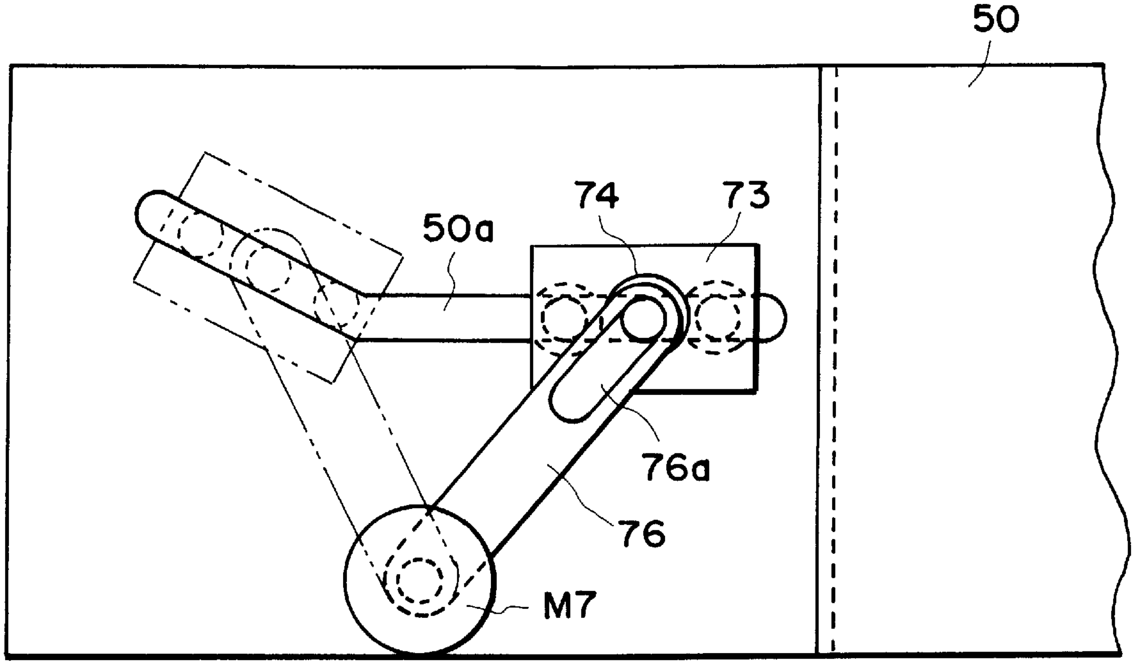
FIG. 19 is a plan view of the driving mechanism for the sheet set edge advancing gripper.

Next, the driving mechanism for the edge advancing gripper 10 will be described referring to FIG. 18, a plan view, and FIG. 19, a front view.

On the front side of the edge advancing gripper, a grooved roller 72 is fixed by crimping, and this roller is fitted in an elongated hole 50*a* cut in the front plate 50 of the gripping-stapling unit. Referring to FIG. 19, the elongated hole 50*a* is cut substantially horizontal on the right-hand side, but on the left-hand side, it is given an angle parallel to the bin angle. Two rollers are connected to each other at the end portion of the axis, with a connecting plate 73, and on the connecting plate 73, a bin member 74 is attached. On the front surface of the front plate 50, an edge advancing motor M7 is mounted, and its power shaft is connected to an oscillating arm 76. The other end of the oscillating arm has an elongated hole 76*a*, in which the end portion of the aforementioned bin member 74 is fitted. When the edge advancing motor M7 is driven, the oscillating arm 76 oscillates between a solid line position and a double dot chain line position in FIGS. 18 and 19. With this arrangement in place, the edge advancing gripper is moved along the elongated hole of the front plate 50, wherein it grips the sheet set at a position in the slanted range, carries it to a position in the horizontal range, releases it there, and returns to the position in the slanted range.

Figure 20:
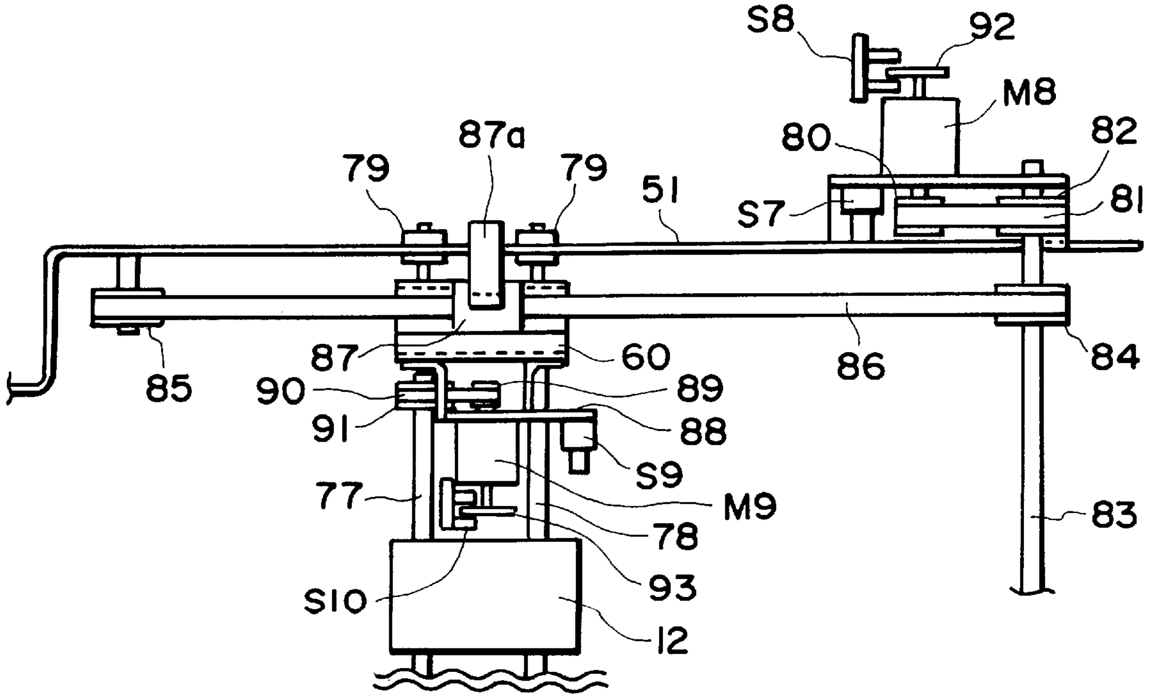
FIG. 20 is a plan view of the driving mechanism for a sheet set transfer gripper.
Figure 21:
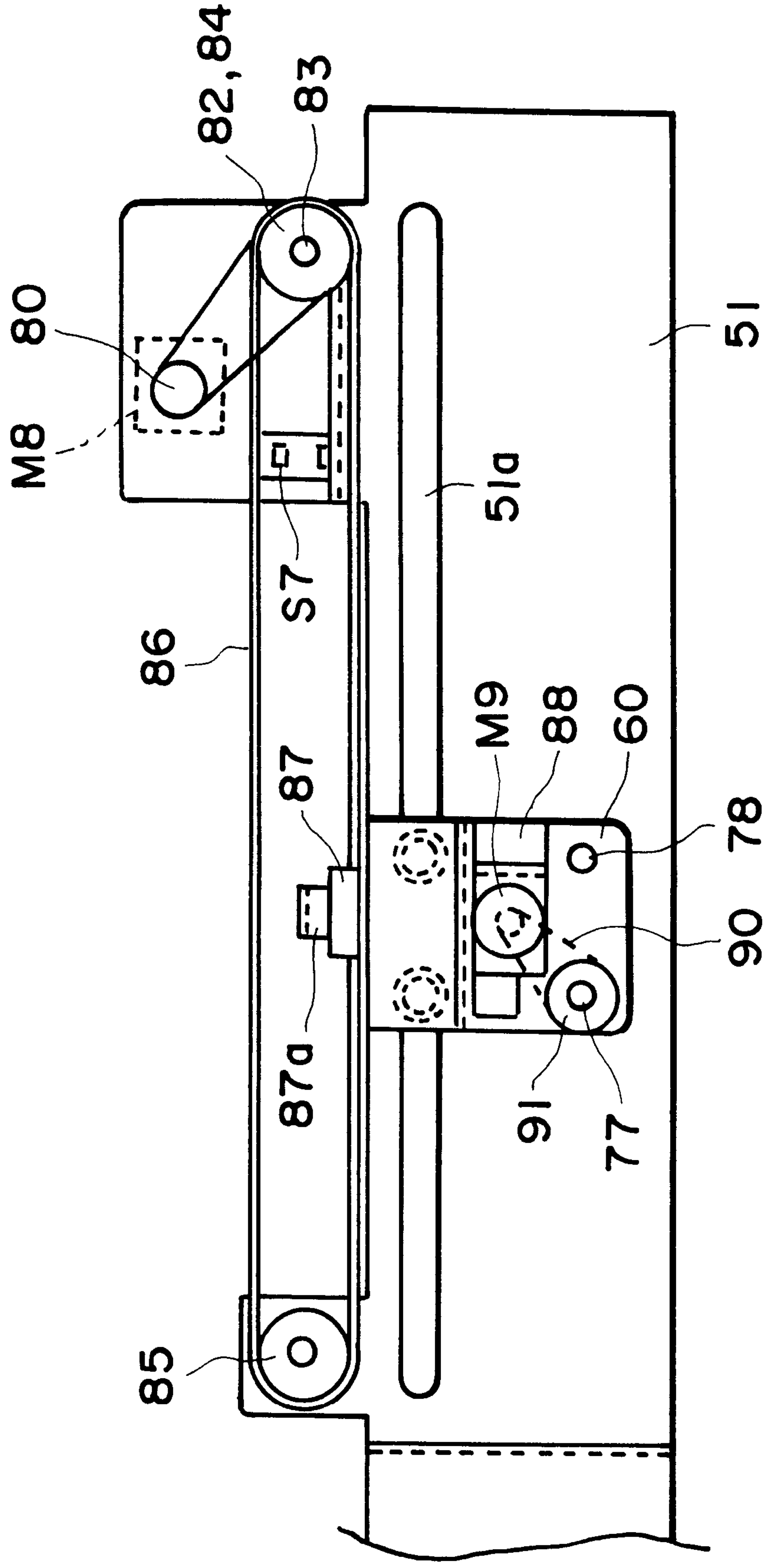
FIG. 21 is a sectional front view of the driving mechanism for the sheet set transfer gripper.

Next, the driving mechanism of the transfer gripper 12 will be described referring to FIG. 20, a plan view, and FIG. 21, a sectional front view.

First, it will be described how the sheet set transfer gripper is driven in the transferring direction, that is, in the lateral direction of FIGS. 20 and 21.

The transferring gripper 12 is supported by two axes 77 and 78 from underneath. The axis 77 is in the form of a ball screw, and the axis 78 is in the form of a plain axis. The axis 77 is supported at each end by a bearing, and the axis 78 is fixed at each end. On each side plate, a guide roller 79 is attached by crimping. It is allowed to move laterally following an elongated hole 51*a* cut in the side plate 51. A motor M8 for moving laterally the transfer gripper is mounted on the side plate 51, and transmits the driving force to a through axis 83 by way of a motor pulley 80, a belt 81 and a pulley 82. On the through axis 83, driving pulleys 84 are mounted, one in front and one in the rear, and belts 806 are stretched between the driving pulleys 84 and correspondent follower pulleys 85. A portion of the belt is fixed to a rear plate 60 using a regulating member 87, whereby the driving force from the motor M8 is transmitted to the transfer gripper 12 so as to move laterally the gripper 12.

Next, it will be described how to drive the transfer gripper 12 in the direction perpendicular to the sheet set transferring direction, that is, in the vertical direction of FIG. 20.

On the rear plate 60, a motor M9 for moving the transfer gripper 12 in the frontward-rearward direction is attached using a base 88. The driving force from the motor M9 is transmitted to a ball screw axis 77 through a motor pulley 89, a belt 90, and pulley 91. A thread correspondent to the thread of the ball screw axis 77 is cut in the transfer gripper 12 on the surface where the gripper 12 makes contact with the ball screw axis 77; therefore, the transfer gripper 12 can be moved frontward or rearward by the rotation of the ball screw axis 77.

The location of the transfer gripper 12 is determined by detecting its home position and the amount of the motor revolution. As for the location in the lateral direction, a projection 87*a* projecting upward from the regulating member 87 is detected by a home position sensor S7, and the distance the transfer gripper moves is detected by a sensor S8 that reads the encoder of the motor M8, whereby the gripper 12 is stopped at a predetermined location.

As for the location in the frontward-rearward direction, a portion of the transfer gripper 12 is detected by the home position sensor S9, and the moving distance is detected by a sensor S10 that reads the encoder 93 of M9, whereby the gripper 12 is stopped at a predetermined location.

Next, referring to FIG. 22, a side view, and FIG. 23, a plan view, it will be described how the stapler 11 is driven in the frontward-rearward direction.

Figure 22:
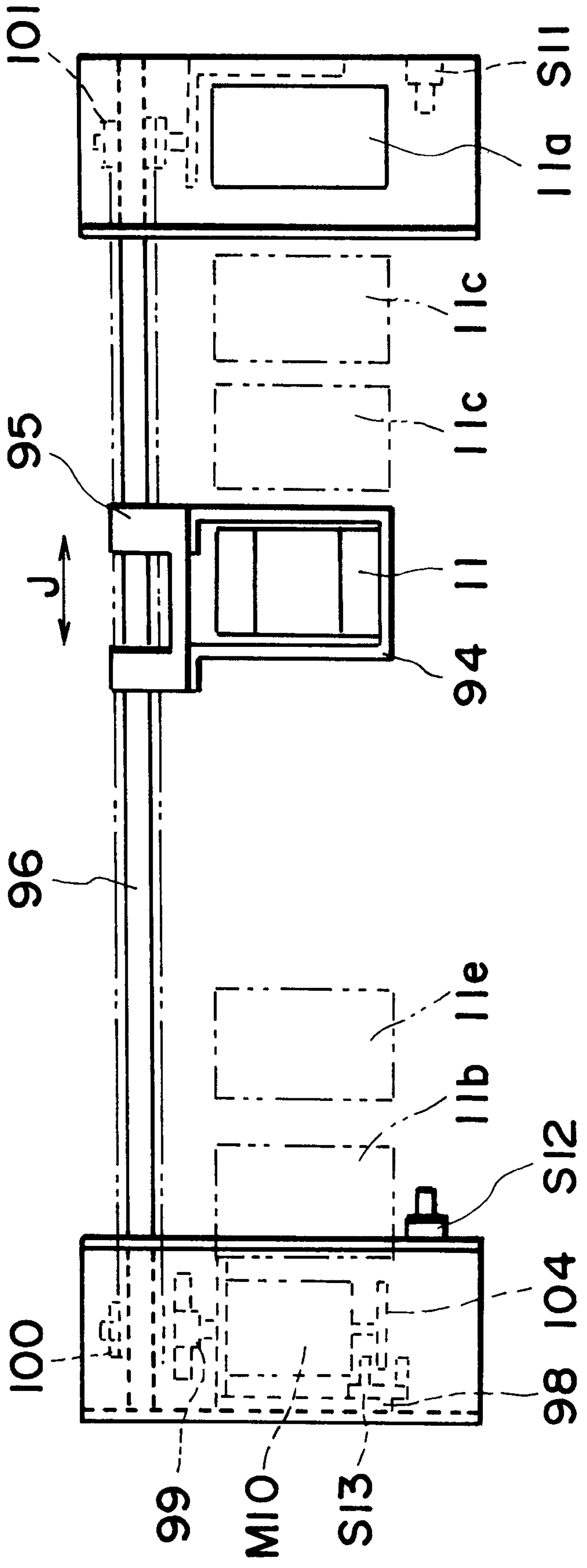
FIG. 22 is side view of the driving mechanism for a stapler unit.
Figure 23:
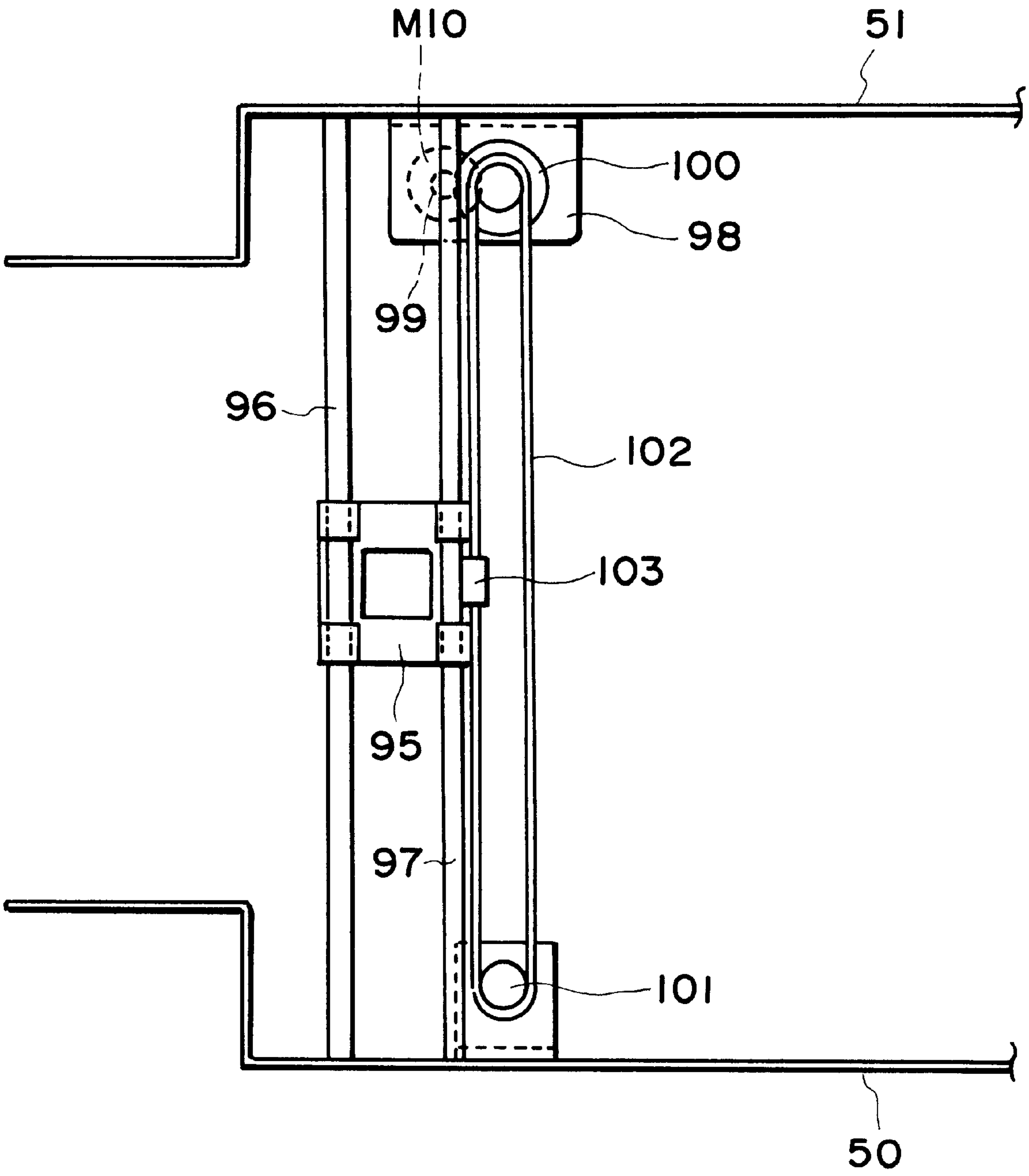
FIG. 23 is a plan view of the driving mechanism for the stapler unit.

Referring to FIG. 22, the stapler 11 is fixed on the base 94. On the upper portion of the base 94, a slider 95 is attached. The slider 95 has four bearing portions through which two axes 96 and 97 are put, wherein the staler 11 is supported by two axes 96 and 97, hanging from them, which are bridged between the front and rear plates 50 and 51 of the unit. A motor M10 for moving the stapler 11 in the frontward-rearward direction is mounted on a motor mount 98, which is fixed to the rear plate 51. The driving force of the motor M10 is transmitted to the stapling unit through a motor gear 99, a motor pulley 100, a follower pulley, a belt 102 stretched between the pulleys, and the slider 95 fixed to the belt 102 using a regulating member 103, whereby the stapling unit can be moved in the direction of an arrow mark J in FIG. 22. The stapling unit can be stopped at any location between a retracted position 11*a* in front and a retracted position 11*b* in the rear. The position of the stapling unit is detected by a position sensor S11 in front and a position sensor S12 in the rear, and the moving distance is detected by a sensor S13 that reads the encoder of the motor M10, whereby the stapling unit is positioned at a predetermined location.

Figure 26:
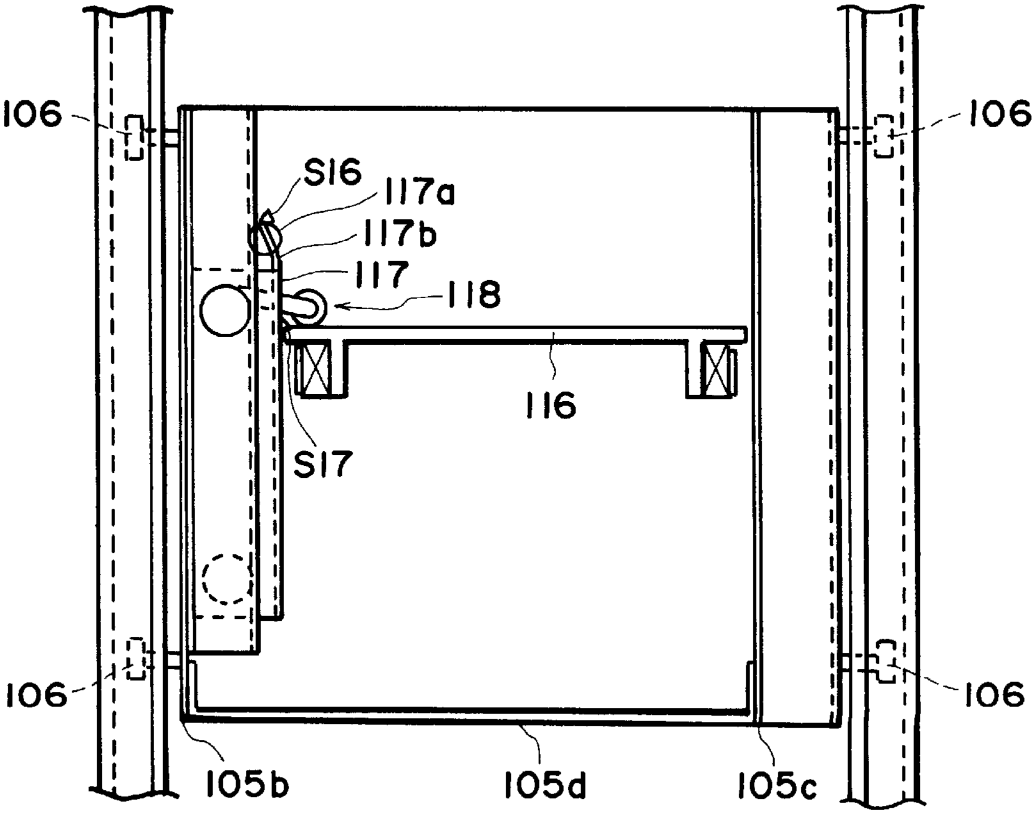
FIG. 26 is a front view of the stacker unit.

Next, the structure of the stacking unit 13 will be described with reference to FIGS. 24, a plan view, FIG. 26, a front view of the frame portion of the stacking unit, and FIG. 27, a side view.

Figure 24:
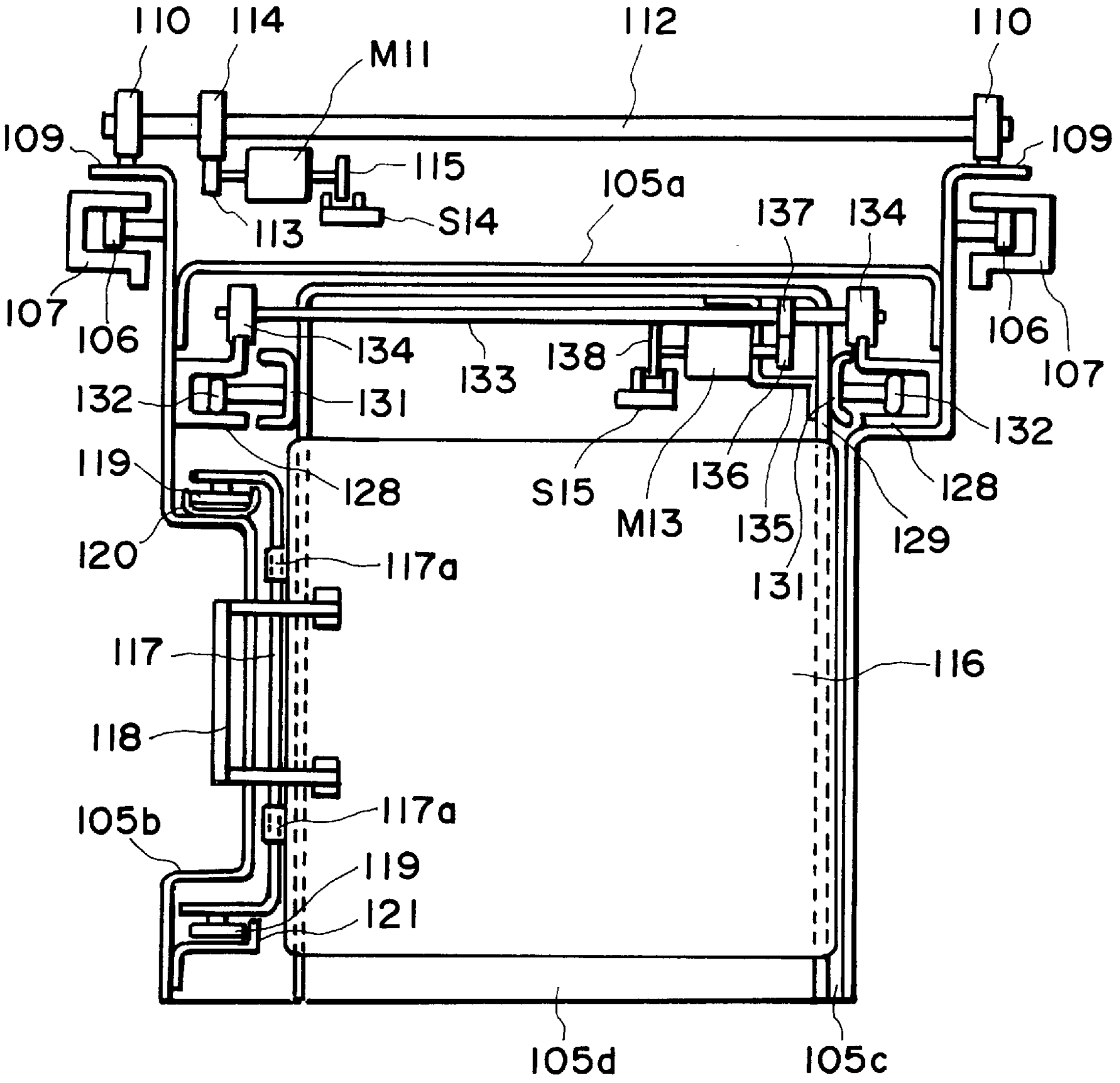
FIG. 24 is a plan view of a stacker unit.

First, referring to FIG. 24, a frame 105, which serves as the outer frame of the stacking unit 13, is constituted of four sections: a rear plate 105*a*, a left plate 105*b*, a right plate 105*c*, and a bottom plate 105*d*. On the exterior surface of the left plate 105*b* and that of the right plate 105*c*, two rollers 106 for vertical movement are attached (total of four rollers), on the rear side, aid these rollers 106 are guided by a rail 107 fixed to the main frame of the apparatus. It should be noted here that this rail 107 may be the very rail 56 of the gripping-stapling unit 9 illustrated in FIG. 15; in other words, the same rail may be shared by the stacking unit 13 and gripping-stapling unit 9.

Figure 27:
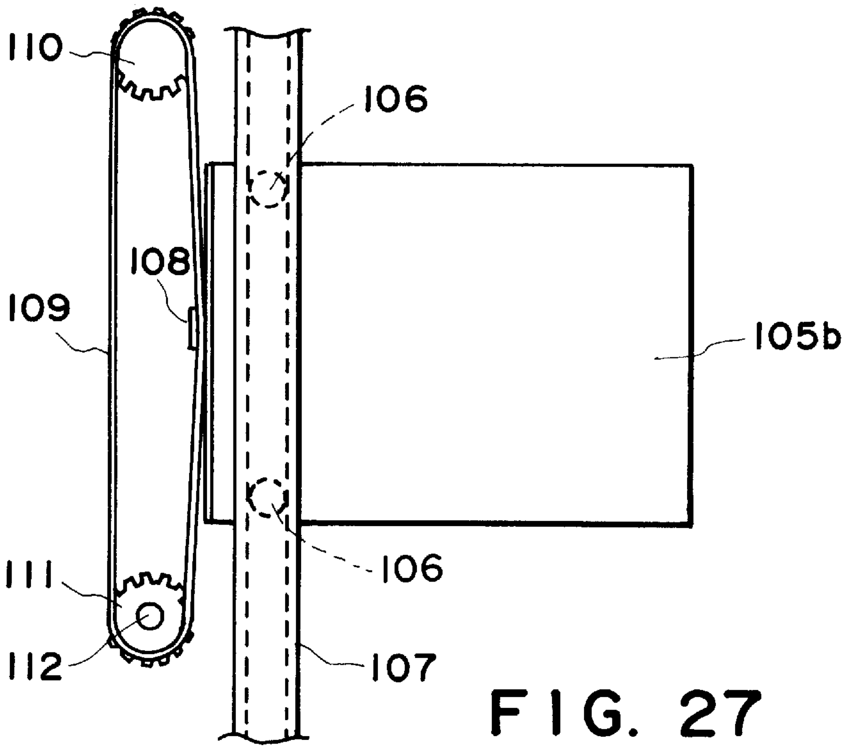
FIG. 27 is a side view of the driving mechanism for the stacker unit.

In FIGS. 24 and 27, a chain 109 is fixed to the bent portion of the left plate 105*b* and another chain 106 is fixed to the bent portion of the right plate 105*c*, wherein the left and right chains are stretched between correspondent top and bottom sprockets 110 and 111. The bottom sprockets are connected with a through axis 112, wherein a motor M11 for moving vertically the stacker frame is mounted on the main frame of the apparatus, and the driving force from the motor M11 is transmitted to the through axis 112 by way of gears 113 and 114, whereby the frame can be vertically moved. As for the locations where the frame is stopped, in addition to two locations correspondent to two stopping locations of the gripping-stapling unit 9 illustrated in FIG. 2 (broken line above, and solid line below), more locations are set, for example, a location at which the stacker tray can be pulled out, which will be described later, a location at which the stacking unit stops after the stacking limit is changed, and the like locations. Normally, the home position of the stacking unit is the position correspondent to the top bin module. Returning to FIG. 24, the stacking unit 13 can be stopped at the aforementioned various locations by reading the encoder 115 of the motor M11 with the use of sensor S14.

On the left plate 105*b* of the stacker frame, a stacking reference wall 117, which serves as a reference wall for the sheet sets on the stacking tray 116, is supported so as to be moved vertically, and also, a pressing member 118 is supported, which holds down the sheet sets on the stacking tray 116 from above.

Normally, the stacking reference wall 117 is positioned at the bottommost level, and is moved upward when the stacking height limit is changed, which will be described later.

As for the mechanism for moving vertically the stacking unit, referring to FIG. 24, a total of four rollers 119, two in front and two in the rear, are mounted on the reference wall, and these rollers 119 are guided by correspondent rails 120 and 121, making it possible to move vertically the reference wall. The driving force comes from an unillustrated motor M12 for moving vertically the reference wail. Also referring to FIGS. 24 and 26, a guide roller 117*a* is rotatively attached to the reference wall 117 so that the trailing end of the sheet set is prevented from getting stuck on the slanted surface formed at the top portion of the reference wall 117.

Further, a proximity sensor S16 is provided on the top end of the reference wall, which detects the distance between the stacking unit and the gripping-stapling unit above, so that when two units approach closer than a predetermined distance, the driving force in the approaching direction is stopped to avoid collision. Further, on the lateral surface of the reference wall, a stack height sensor S17 is mounted, which detects the topmost sheet of the accumulated sheet sets to control the vertical position of the stacking tray 116 or the like.

Next, the pressing member 118 will be described with reference to FIG. 28.

The pressing member 118 holds down the sheet set S on the stacking tray 116 in order to serve two purposes, that is, to prevent the sheets of the sheet sets having been already accumulated on the stacking tray 116 from being disturbed by the sheet set being stacked on the stacking tray, as well as to prevent the sheet sets from being shifted in the sheet set stack by the shock generated as the next sheet set drops on the accumulated sheet sets.

The detailed movement of the pressing member 118 will be given in a paragraph in which the operation of the pressing member 118 is described, and here, only the general mechanism will be described.

The pressing arm 122 has a member having a roller 123 at one end, and the end opposite to the roller is rotatively connected to one end of the large link 124. Also, the pressing arm 122 is provided with a pin 122*a* projecting from a portion of the pressing member 122, and this pin 122*a* is movably fitted in a cam groove formed in the lateral surface of a cam member 125. The cam groove has a crescent-shaped cam surface, wherein a flapper 126 pivotable about an axial point 126*a* is provided at the switchback point of the cam surface on the left side of the drawing, allowing the pin to move only in one direction.

To a driving solenoid SL2, one end of a small link 127 is connected, and the other end is connected to the end of the large link 124.

Figure 28:
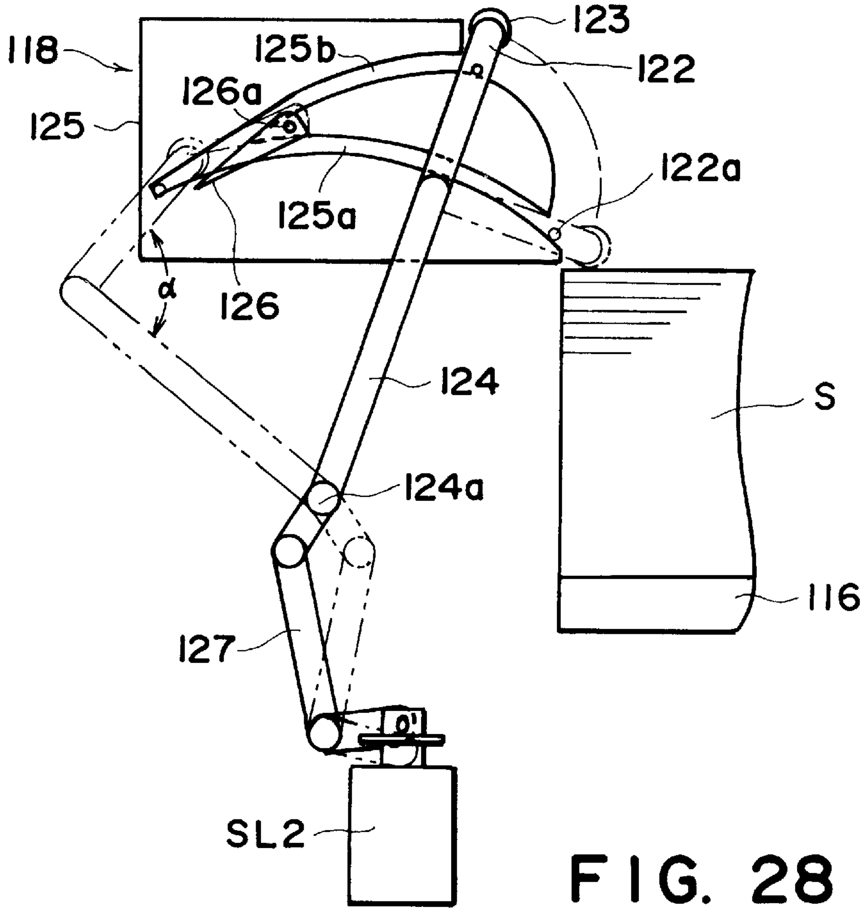
FIG. 28 is a front view of a sheet set pressing member.

Referring to FIG. 28, when the solenoid SL2 is off, the pressing linkages 124 and 127 are in a state depicted by a solid line, and in this state, the pressing arm 122 drops down onto the sheet set due to its own weight, thereby holding the sheet down. When the solenoid SL2 is turned on, the pressing links 124 and 127 are moved to a position depicted by a double dot line. At this time, the large link 124 is rotated counterclockwise about an axial point 124*a*, whereas the pressing arm 122 moves along a cam surface 125*a* with the pin 122 in contact with the cam surface 125*a*. At this time, the pin 122*a* pushes away the flapper 126. Then, as the solenoid SL2 is turned off in this state, the pressing links 125 and 127 try to return to the position indicated by the solid line, wherein at this time, the pressing arm 122 follows the upper portion of the cam groove, with the pin 122*e* riding on the upper cam surface 125*b*. In other words, an angle $\alpha$ between the large pressing link 124 and pressing arm 122 gradually widens from a substantially right angle to 180°. When the pressing links 124 and 127 stop moving, the pressing arm 122 drops again onto the sheet set due to its own weight. Thus, the pressing member 28 repeats the above described routine to hold down the sheet sets on the stacking tray 116.

Since the pressing member 118 follows the vertical movement of the reference wall 117, their positional relationship does not change.

Next, the stacking tray 116 will be described referring to FIG. 24, and FIG. 25, which is a front view of the front portion of the stacking tray and its adjacencies.

The stacking tray 116 is fitted within the aforementioned stacker frame 105, and is controlled to descend gradually so that the uppermost surface of the sheet set stack remains at a predetermined level.

Figure 25:
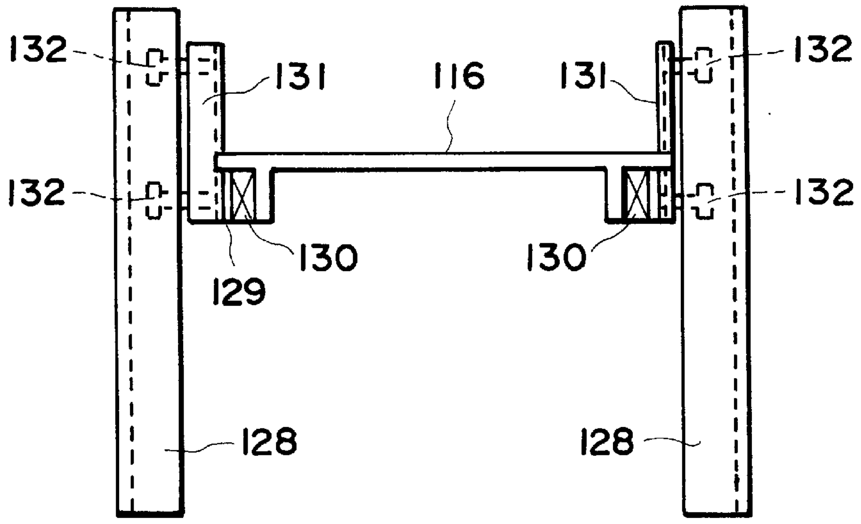
FIG. 25 is a front view of a stacking tray.

Referring to FIGS. 24 and 25, reference numerals 128 and 128 designate rails, which are fixed to correspondent side plates. The stacking tray 116 rests on an ACCURIDE 130, and can be pulled out of a stacker tray base 129 toward the front. On the outward facing left and right surfaces of the stacking tray base, a U-shaped roller mounting plate 131 is attached, to which two rollers 132 are mounted by crimping. These rollers 132 are guided by the rail 128. At one end of the rail 128, a vertical rack is provided, which meshes with a pinion gear 134 mounted at each end of an axis 133, which is horizontally put through the base 129. A motor M13 for moving vertically the stacking tray is mounted on the stacking tray base 129 with the use of a motor mount 135, and the driving force from the motor M13 is transmitted through gears 136 and 137. The descending amount of the stacking tray is controlled by reading an encoder attached to the other end of the motor M13 with the use of sensor S15.

Figure 29:
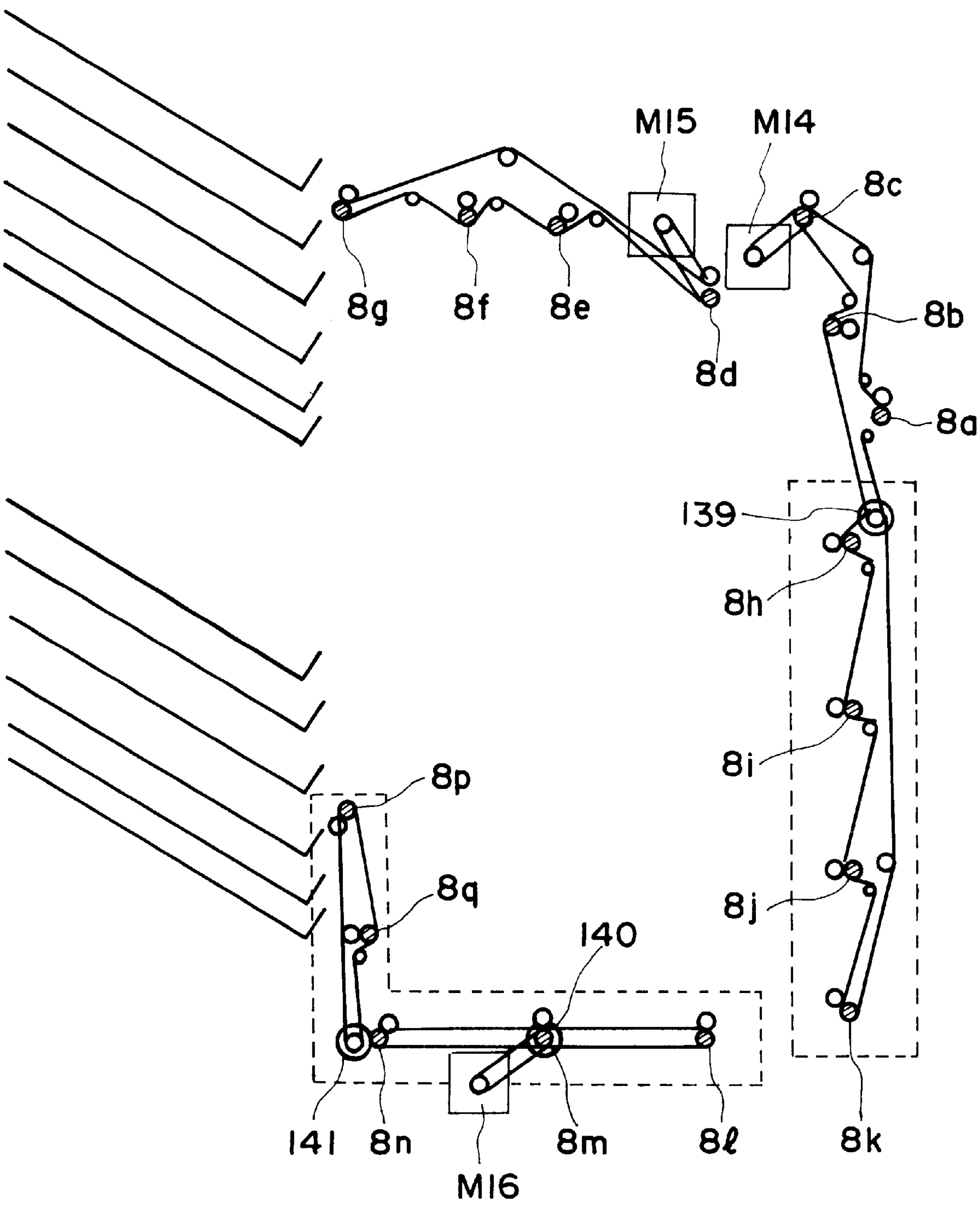
FIG. 29 is a schematic view of the driving mechanism for a sheet conveying system.

Next, a description will be given as to the driving mechanism of the sheet delivery system (FIG. 29). FIG. 29 is a schematic view of the driving mechanism. The hatched one of each roller pair is the driving side and the other is the follower side. Roughly speaking, the driving system can be divided into three sub-systems.

First, a sheet delivery motor M14 is in charge of the sub-system closest to the main assembly of the copying apparatus, and delivers its force to the vertical delivery path and non-sort delivery path that come after the path branches into the delivery path to the top bin module and delivery path to the bottom module. There are seven roller pairs involved in this sub-system: roller pairs 8*a*–8*c*, and 8*h*–8*k*.

Next, a sheet delivery motor M15 takes care of the horizontal path for the top bin module, and delivers its driving force to four roller pairs 8*d*–8*h*.

A sheet delivery motor M16 is in charge of the horizontal path of the bottom bin module and the vertical path leading to the final exit, and drives five roller pairs 8*l*–8*p*.

The areas surrounded by the broken lines in FIG. 29 designate the sections that can be drawn out toward the front when a jam or the like has to be dealt with; therefore, coupling 139 and 140 are provided for simple disengagement.

In the sub-system driven by the motor M16, the top side is the driving side in the case of the horizontal path roller pairs 8*l*–8*n*, whereas the right or top side is the driving side in the case of the vertical path roller pairs 8*p* and B*q*; therefore, a gear 141 is meshed in, to reverse the rotational direction.

The reason for dividing the driving system into three sub-systems is to make it possible to vary the speed of the sheet processing apparatus in response to the location of the sheet in the apparatus so that more time can be afforded for letting the sheet fall (settle) into the bin or for aligning the sheet. More specifically, when a portion of a sheet is still in the main assembly of the copying machine, the speed of the sub-system closest to the main assembly of the copying machine is adjusted as close as possible to the speed of the copying machine so that the sheet is not damaged, and after the sheet entirely enters the sheet processing apparatus, the sheet delivery speed is increased so that the sheet interval, more precisely, the time between when the trailing end of the preceding sheet is discharged and when the leading end of the following sheet arrives, can be extended. Therefore, according to a normal setting, the speed of the motor M14 is rendered substantially the same as that of the main assembly of the copying machine, and those of the motors M15 and M16 are kept faster except when the sheet delivery speed needs to he reduced while the sheet is discharged. Further, assuming that when a longest sheet in the sheet advancing direction is fed, its leading end is gripped by the most upstream side roller pair 8*d* or 8*e* controlled by the motors 15 or 16, respectively, and the trailing end comes to be gripped by, for example, the roller pair 8*a*, or 8*j*, respectively, a one-way clutch may be provided for four roller pairs 8*b*, 8*a*, 8*k* and 8*j* so that the resistance, which is generated due to the acceleration of the sheet that occurs when the leading end of the sheet is gripped by the roller pair 8*d* or 8*e*, can be reduced.

Figure 30:
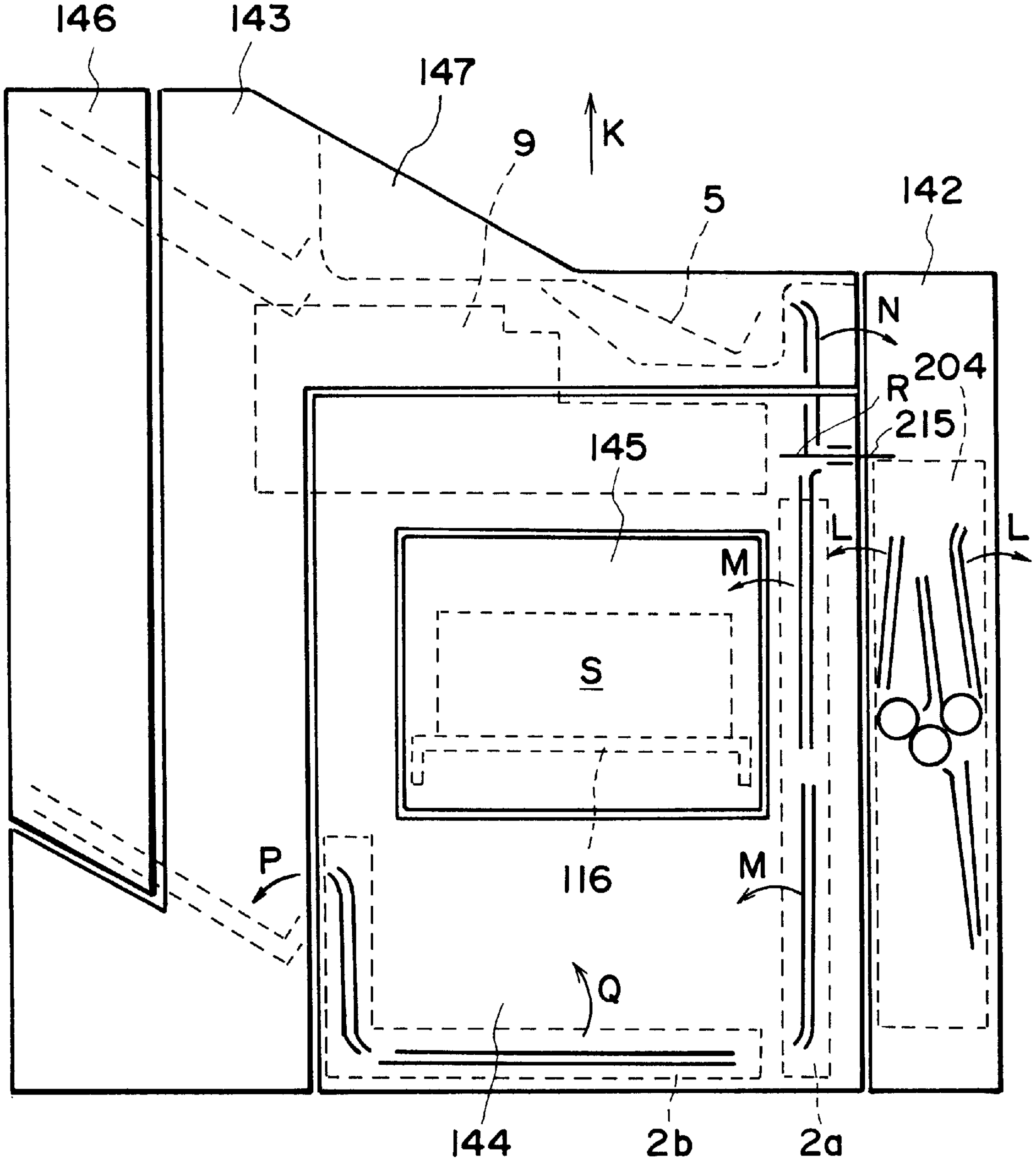
FIG. 30 is a structural drawing for cover members.

Next, the structure of the cover will be described (FIG. 30).

FIG. 30 is a schematic front view of the apparatus, depicting the cover configuration. The front cover is constituted of five pieces: a folder cover 142 for covering a folding apparatus 204; a fixed cover 143 that vertically covers the area on the right-hand side of the sheet processing apparatus from the top down; a front cover 144 that covers the bottom bin module paths 2*a* and 2*b* of the sheet processing apparatus, and a portion of the gripping-stapling unit 9; a sheet and sheet slack removal cover 145 that allows the removal of the sheet or sheet stack on the bin tray or stacking tray positioned where removal is possible; and a bin cover 146 that vertically covers the left-hand side of the bin section.

Also, there is a top path cover 147 that constitutes the non-sort tray 5 and the top surface of the top bin module path. It has a rotational axis at the rear, whereby the front side can be opened upward as shown by an arrow mark K in FIG. 30.

The folder cover 142, stack removal cover 145, and bin cover 146 can be independently opened. However, when the front cover 144 is opened, the stack removal cover 145 is opened together with it. As for the opening method, they all rotationally open about their rotational axis, wherein the folder cover 142, front cover 144 and stack removal cover 145 have their axis on the left-hand side, and the bin cover 146 has its axis on the right-hand side to be opened frontward.

Though the front portion of the bin section is covered with the bin cover 146, the left-hand side end portion of the bin section is exposed so that it becomes possible to access the sheet or sheet sets from the left side without opening the bin cover 146. It is needless to say that when a short sheet in terms of the sheet delivery direction needs to be taken out of the bin, it can be accessed not only from the left side, but also from the front side toward the right rear by opening the bin cover 146.

Next, a method for handling a jam will be described (FIG. 30).

A jam in the folding apparatus 204 is handled in the following manner. First, the folder cover 142 is opened and the folding apparatus is entirely pulled out frontward. Then, the jammed sheet is taken care of by pulling apart the guide plates (arrow L) in the lateral direction of FIG. 30

A jam in the vertical path, which branches into the top and bottom portions at a horizontal line designated with a double dot chain line R adjacent to the sheet entrance 125, is handled in the following manner. In the case of a jam in the portion below the sheet entrance 215, a section 2*a* illustrated in FIG. 30 is pulled out frontward in the same manner as the folding apparatus 204, and then, each of the two guide pieces constituting the left guide plate is rotated in the direction of an arrow mark M about an axis provided at the bottom end thereof. In the case of a jam in the section above the sheet entrance 215, after the top path cover 147 is opened in the arrow mark K direction, the right-hand side guide plate is opened from above in the direction of an arrow mark N about an bottom end axis thereof.

Next, as for a jam in the horizontal path, when it is in the path in the top portion of the apparatus, the top path cover 147 is opened in the arrow mark K direction as described in the foregoing, and when it is in the path in the bottom portion, a section 2*b* illustrated in the drawing is pulled out frontward, wherein when the jam is in the horizontal section, the top guide plate is opened in the direction of an arrow mark O about an axis in the rear, and when the jam is in the discharging section, the left-hand side guide is opened in the direction of an arrow mark P.

Next, as for a method for dealing with a sheet remaining in the bin modules, the one stuck in the bin module section with wider bin intervals is removed from the exposed left-hand side end of the bin module, and the one stuck in the section with narrow bind intervals or the short one in terms of the sheet delivery direction is removed from the front side by opening the bin cover 146.

Lastly, a sheet jammed in the gripping-stapling unit 9 or stacking unit 13 is removed by opening the front cover 144. In this case, the location of the jam in the unit 9 or 13 is detected, and the gripping-stapling unit 9 or stacking unit is stopped at a location where the jammed location is most conveniently exposed. For example, when a jam in the gripping-stapling unit 9 needs to be handled, the stacking unit is first moved to the lowermost level, and then, the gripping-stapling unit 9 is lowered as far as possible without downward interference, which affords a space to make it easier to take care of the jam. On the other hand, when it is necessary to take care of a jam in the stacking unit, the gripping-stapling unit 9 is moved to the topmost position, being stopped there, and then the stacking unit is lowered until a space large enough to handle the jam is created above the stacking unit.

The above described operations may be automatically carried out, or a manual vertical movement switch may be provided for each unit so that the unit can be freely moved to a position where the jam can be most easily handled.

Below, the operations of the post-image formation sheet processing apparatus will be described with reference to the structure described hereinbefore.

To begin with, the basic operation will be described.

First, a set of originals is placed on the original table 105 of the automatic original circulating apparatus 202 joined with the main assembly 201 of a copying machine (FIG. 1), and after a predetermined copying mode selection is inputted through an unillustrated control panel, a start key is depressed, whereby various sections of the post-image formation sheet processing apparatus 203 are brought to a state of being on standby in response to the signal generated as the start key is depressed. Hereinafter, the description will be given in correspondence with the mode selections.

(A) Non-sort Mode

Referring to FIG. 2, the deflectors 3 and 4 are oriented as outlined by the solid and broken line, respectively, and the motor M14 is controlled so as to rotate the roller pairs 8*a*, 8*b* and 8*c* distributed across the first and sixth sheet delivery paths (FIG. 29). Needless to say, the roller pairs in the folding apparatus 204 are rotated by an unillustrated folder motor M17, being readied for sheet reception. It should be noted here that the apparatus readying steps taken up to this point may be carried out after the copying operation begins as long as the sheet processing apparatus can be readied to be on standby before the sheet is discharged from the main assembly of the copying machine. As soon as the sheet processing apparatus enters the standby state, a sheet of an original from the original set 206 in FIG. 1 is fed onto the platen glass 207 of the copying machine main assembly 201 by the automatic original circulating apparatus 202, and the copying machine main assembly 201 begins copying.

The first sheet, which is discharged from the copying machine main assembly 201 after an image is formed thereon, passes through the top path of the folding apparatus 204 and advances into the stapling-stacking apparatus 205 through the sheet entrance 215, where the sheet is directed straight upward by the deflector 3. Then, it is delivered further upward on the right-hand side of the deflector 4, and is discharged into the non-sort tray by the discharge roller pair 8*c*.

(B) Sort Mode

In this mode, a special control is sometimes executed depending on the sheet condition or mode related condition, but at this time, a general operation carried out in the sort mode will be described.

First, during the start-up operation, both deflectors 3 and 4 are oriented as outlined by the solid line, and the roller pairs 8*a*, 8*b*, and 8*d*–8*g* of the top path of the folding apparatus 204 begin to be rotated. The top and bottom bin modules B1 and B2 are shifted so that the topmost bins B11 and B12 come to the locations where they face the discharge roller pairs 8*g* and 8*p*, respectively. The aligning wall 15 of the bin module is moved to a position correspondent to the sheet width and remains there on standby. Since the guide member of the folding apparatus is not involved in this mode, it is made certain that the guide member is at the retracted position so as not to stick out toward the bin. Further, it is also made certain that the upright portion of the bin is not activated.

The gripping-stapling unit 9 is moved to a position (outlined by the broken line in FIG. 2) correspondent to the sheet set transfer from the top bin module, and is kept there on standby.

Referring to FIG. 15, the moving members within the gripping-stapling unit will be described. The gripper 10 remains on standby at a location indicated in FIG. 1.5 so that it does not interferes with the sheet on the bin when the bin module located on the left-hand side of the gripping-stapling unit 9 is vertically moved.

Since the stapler 11 is not operated, it is moved to the retracted position on the front side outlined by the broken line in FIG. 15. The transfer gripper 12 is moved in the arrow mark F direction as well as arrow mark G direction to a position 12*a* outlined by the broken line in FIG. 15, where it can grip the delivered sheet at the substantially middle portion of the sheet edge advanced by the sheet edge advancing gripper 10, and is kept there on standby.

While on standby, both the edge advancing gripper 10 and transfer gripper 12 are open.

Next, the stacking unit 13 is moved to a position outlined by the broken line in FIG. 2, being prepared for receiving the sheet set to be delivered from the gripping-stapling unit 9. Referring to FIG. 26, the stacking tray 116, reference wall 117, or pressing member 118 within the stacking unit 13 is moved to a position where it allows the top surface of the stacking tray 116 to receive the sheet sets without interference, and the other members are also moved to respective positions to accommodate the stacking tray. The pressing end of the pressing member 118 is sticking out on the stacking tray 116 side as illustrated in FIG. 26.

Thus, the sheet processing apparatus enters the state of being on standby through the start-up operation. Meanwhile, in the main assembly of the copying machine, the original is fed in the same manner as it is in the non-sort mode; an image is formed on a sheet; and the sheet bearing the image is discharged into the sheet processing apparatus.

Referring to FIG. 2, the first sheet is passed through the top path of the folding apparatus; delivered into the sheet processing apparatus through the sheet entrance 215; directed upward by the deflector 3; directed leftward by the deflector 4; and discharged onto the bin B11 by the discharge roller pair 8*g*.

As soon as a sheet discharge sensor S18 detects the first sheet discharged on the bin B11, the bin module is shifted upward by one bin, so that the bin B12 moves up to the sheet receiving position. This step is repeated till a sheet with the same image is discharged onto all the bins in the top bin module. Then, the first sheet of the original set is replaced with the second sheet of the original, and the copying machine begins to copy the second sheet of the original. At this moment, the top bin module is positioned in such a manner that its bottommost bin (B16 in FIG. 2) is at the sheet receiving position; therefore, when the second sheet of the original is copied, the copy is discharged into the top bin module starting from the bottommost bin and continuing upward. These steps are repeated until all the sheets of the original are copied, and then, the sheet reception into the top bin module ends. At this moment, when the number of the sheets in the original set is an odd number, the bottommost bin 16 is at the sheet receiving position at the end the sheet, and when it is an even number, the topmost bin B11 is at the sheet receiving position.

Next, the operation moves on to a step in which the sheet set is transferred from the bin. In this embodiment, the sheet set transfer position for the top bin module, that is, where the gripping-stapling unit 9 is on standby, and is below the sheet receiving position by an amount equivalent to two bins. Therefore, the order in which the sheet is transferred is changed according to the number of the sheets in a set of originals.

Figure 31:
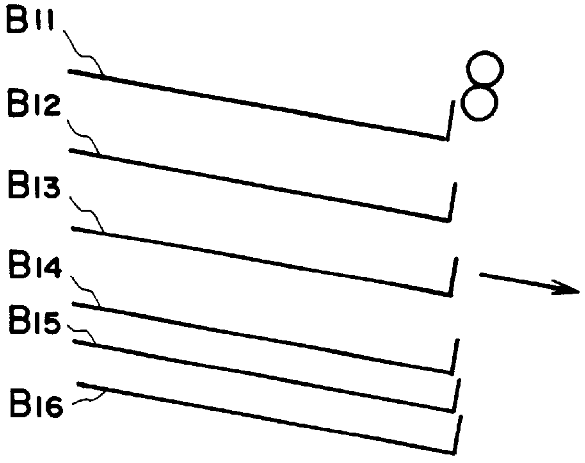
FIG. 31 is a schematic drawing for depicting a state of the bin movement.
Figure 32:
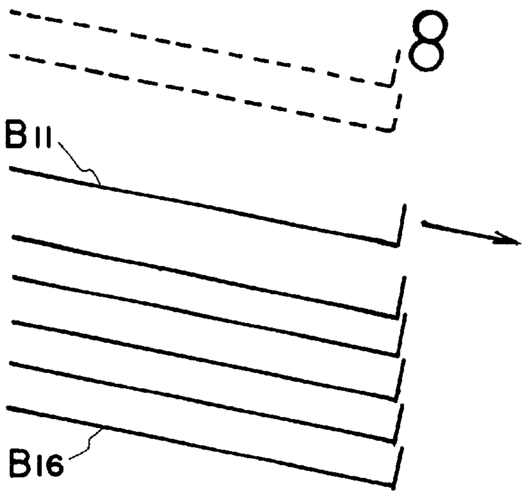
FIG. 32 is a schematic drawing for depicting another state of the bin movement.
Figure 33:
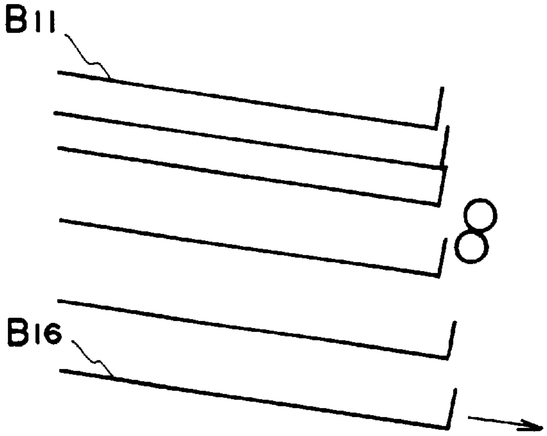
FIG. 33 is a schematic drawing for depicting another state of the bin movement.

(A)-(i) When the number of the sheets in a set of originals is an even number:

When the sheet count in a set of original is an even number, the position of the top bin module at the end of the sorting is the same as the one at the beginning of the sorting; in other words, the top bin module is in the state illustrated in FIG. 31. In this case, the sheet set transfer is not started from the B13, which is at the sheet set transfer position at this moment. Instead, the top bin module is lowered by two bins to realize the state illustrated in FIG. 32. Then, the sheet set is first taken out of the topmost bin B11, working sequentially down to the bin B16 (FIG. 33).

Figure 34:
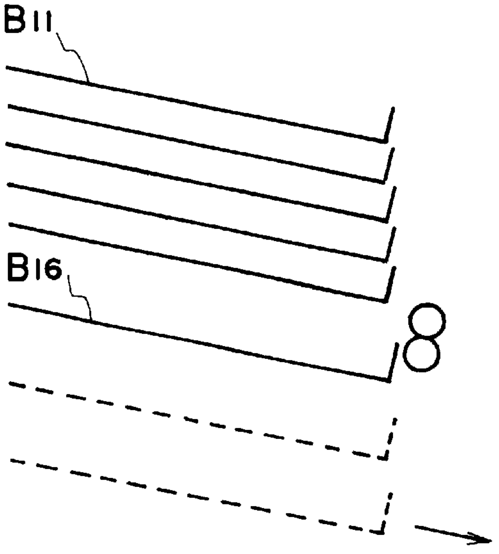
FIG. 34 is a schematic drawing for depicting another state of the bin movement.

Thereafter, the top bin module is raised by two bins to realize the state illustrated in FIG. 34, in which the top bin module is ready for receiving the next group of sheet sets, completing the sheet transfer step.

Assuming that it is necessary to make more sets of copies and the job is continued, when the top bin module begins to receive the second group of sheet sets from the state of FIG. 34, the top bin module again ends up in the state of FIG. 34 since the number of the sheets in the set of originals is an even number. In this case, there is no bin at the sheet set transfer position: therefore, the top bin module is lowered by two bins, realizing the state of FIG. 33, and the sheet set transfer is started from the bottommost bin B16, working sequentially its way up to bin B11. When the bin B11 is finished, the state illustrated in FIG. 32 is realized; therefore, the top bin module is raised by two bins, restoring the state of FIG. 31. In other words, when the top bin module is caused to receive repeatedly the sheet sets, the state of the top bin module is repeatedly changed among the above described ones.

(A)-(ii) When the number of the sheets in a set of original is an odd number:

When the sheet count in the set of originals is an odd number, the position of the top bin module at the end of the sorting is exactly opposite to the one at the beginning. That is, when the sorting begins from the state of FIG. 31, the state of FIG. 34 is realized at the end. At this moment, there is no bin at the sheet set transfer position, therefore, the top bin module is lowered by two bins, realizing the state of FIG. 33, and then, the sheet set transfer is started from the bottommost bin B16, working sequentially its way up to the bin B11. When the bin B11 is finished, the top bin module is in the state of FIG. 32; therefore, the top bin module is raised by two bins to realize the state of FIG. 31, in which the top bin module is ready for receiving the next group of sheet sets, completing the sheet set transfer step. When the same job is continued and the next group of sheet sets are received, the sorting starts from the state illustrated in FIG. 31 and ends in the state of FIG. 34. Therefore, the state of the top bin module is also changed among the ones described above.

In the case of the bottom bin module in this embodiment, the positional relationship between the sheet receiving positions and sheet set transferring position is opposite to the one in the top bin module; in other words, the sheet transferring position is two bins above the sheet receiving position. At this time, the detailed description as to the bin control for the bottom bin module will not be given, but the control is substantially the same as the above described one for the top bin module, and the similar state changes are repeated. Next, the rest of the description of the sort mode operation will be continued.

Referring to FIG. 3, the sheet deposited on the bin is abutted against the reference rods 14*a* and 14*b*, being thereby aligned, by moving the aligning wall 15 in the direction perpendicular to the sheet delivery direction.

Referring to FIG. 16, after the sheets are sorted and aligned, the sheet set edge advancing gripper 10 is moved, with the gripping portion open, from the solid line position to the broken line position, where it is caused to grip the sheet set S on the bin. Next, referring to FIG. 14, the upright portion Bj of the bin is released by the solenoid SL1 to allow the sheet set to be transferred.

Next, the sheet set is advanced rightward to a position outlined by a solid line in FIG. 16 while being regulated by the reference rods 14*a* and 14*b* and aligning wall 15, on the front and rear sides, respectively, as shown in FIG. 4, and also by a guide member 53*b* on the rear side as shown in FIG. 15. At this time, the bottom surface is guided by the bin surface, the surface of the laid down upright portion Bj of the bin, and a guide stay 53, and the top surface is guided by a guide stay 52. Then, the sheet set is temporarily stopped at the solid line position, where it is relayed from the edge advancing gripper 10 to the transfer gripper 12, in the following manner.

Figure 35:
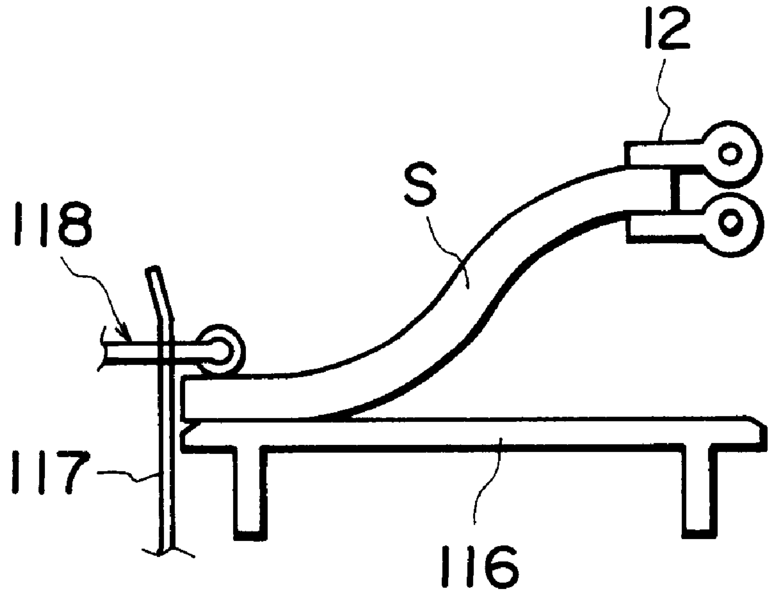
FIG. 35 is a schematic drawing for depicting the effect of the sheet set pressing member.

First, the transfer gripper 12, which has been on standby, with its jaw open, at a position outlined by the broken line in FIG. 15, grips the sheet set at the substantially center portion of the advanced sheet set edge. Next, the edge advancing gripper 10 is caused to loosen its grip, being thereby readied for advancing the next sheet set. Thereafter, the transfer gripper 12 is moved to the right in the arrow mark G direction in FIG. 15, pulling the sheet set to the right, and is stopped at a proper position for the sheet size. At this moment, referring to FIG. 35, the trailing end of the sheet set S has fallen to the top surface of the stacking tray 116, with the left edge being regulated by the reference well 117 of the stacking unit, and the top surface being held down by the pressing member 118 having been driven by the solenoid. Then, the transfer gripper 12 is released to allow the leading end of the sheet set S to fall to the stacking tray.

At this time, the pressing member 118 functions to prevent the sheets within the falling sheet set from shifting.

Next, as for the transfer of the second sheet set, it is the same as the transfer of the first one up to the point where the sheet set is gripped by the transfer gripper 12 at the substantially middle portion of the sheet set edge to be relayed between the grippers; therefore, only the steps thereafter will be described.

After the sheet set is relayed, the transfer gripper 12 is moved in the arrow mark F direction by a predetermined distance. At this time, the reference rods, aligning wall, and guide member 53*a* may be retracted so as to prevent the sheet set from being regulated on the rear side, or the transfer gripper 12 may be moved in the arrow mark F direction after the trailing end of the sheet set completely clears these laterally regulating members. This movement makes it possible to separate the second sheet set from the first one after it is transferred onto the stacking tray.

Figure 36:
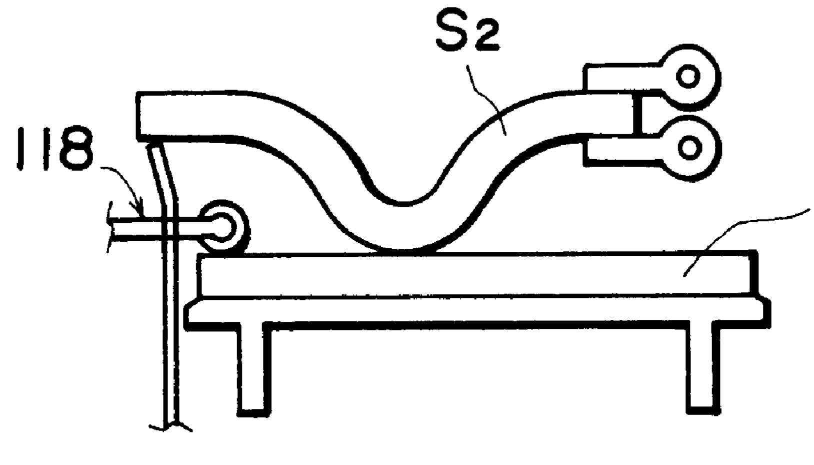
FIG. 36 is a schematic drawing for depicting the effect of the sheet set pressing member.

Referring to FIG. 36, while the sheet set is moved to the right by the transfer gripper 12, the central portion of the sheet set S drops on the stacking tray before the trailing end arrives at the predetermined spot. If the sheet set transfer is continued under this condition, the sheet set S2 being transferred is liable to disturb the sheet alignment of the sheet set S1 having been deposited; therefore, the top surface of the sheet set S1 having been deposited is held down by the pressing member 118 so that the sheets in the sheet set S1 are prevented from shifting.

The topmost surface of the stack of the sheet sets deposited on the stacking tray is constantly monitored by the sensor, and in response to the signal from the sensor, the stacking tray is gradually lowered so that the interval between the gripping-stapling unit above and the topmost surface of the stacked sheet sets remains constant.

The sheet sets on the stacking tray can be taken out any time except for the time when the stacking unit is operating. As an operator presses an unillustrated sheet set removal bottom, the stacking unit moves to a sheet set removal position, and only the stack removal cover becomes openable.

After the sheet sets are taken out and the cover is closed, the sheet processing operation can be continued.

(C) Stapling Mode

As far as the sheet or sheet set movement is concerned, this mode is the same as the sorting mode; therefore, its description will be omitted here, and only the stapler movement control will be described.

Referring to FIGS. 15 and 22, the stapler 11 can be stopped at any location between the front side retracted position 11*a* and rear side retracted position 11*b*.

(C)-(i) Single Point Binding on Front Side

In the non-stapling modes described above, the stapler 11 is at the front side retracted position 11*a*, but when the single point front side binding mode is selected, the stapler 11 remains on standby at a position 11*c* indicated in FIGS. 15 and 22. Even when the stapler 11 is on standby at a position 11*d* indicated in FIG. 15, it and the transfer gripper 12 can remain on standby without interfering with each other, since the transfer gripper 12 is at a position 12*a*. After stapling the sheet set advanced by the edge advancing gripper 10, the stapler 11 is moved to the front side retracted position 11*a*, and then, the sheet set is conveyed to the right by the transfer gripper 12. After the trailing end of the sheet set clears the moving range of the stapler 11, the stapler 11 moves back to the single point front binding position 11*c* and waits for the next sheet set.

(C)-(ii) Two Point Binding

In the two point binding mode, the binding points vary depending oil the sheet measurement in the direction perpendicular to the sheet delivery direction. Let it be assumed that the sheet size is such that it is to be bound at two stapling points 11*d* and 11*e* indicated in FIGS. 15 and 22. Also, in this case, the stapler 11 does not interfere with the transfer gripper whichever of the positions 11*d* and 11*e* indicated in FIG. 15 the stapler 11 may be at. As the two point binding mode is selected, the stapler 11 is moved from the front side retracted position 11*a* to the front side binding point 11*d* and is kept there on standby. In this case, the transfer gripper 12 is kept on standby at a position 12*b* outlined by a solid line.

After being advanced by the sheet edge advancing gripper, the sheet set is stapled on the front side binding point by the stapler 11 at the front side stapling position 11*d*. At this time, the advanced sheet edge is still held by the edge advancing gripper Then, the stapler 11 is moved to the position 11*e*, and the sheet set is stapled at the second binding point, that is, the point on the rear side. Next, as soon as the stapler 11 is moved from the position 11*d* to the position 11*e*, the transfer gripper 12 is advanced from the standby position 12*b* to the position 12*a* and grips the sheet set. At this moment, on the other hand, the edge advancing gripper 10 releases the sheet set. After stapling the sheet set on the second binding point at the stapling position 11*e*, the stapler 11 is moved to the rear side retracted position 11*b*. Then, as soon as the trailing end of the first sheet set clears the moving range of the stapler 11, the stapler 11 is moved from the retracted position 11*b* to the stapling position 11*e* on the rear side, and receives the second sheet set. However, this time, the stapler 11 first staples the sheet set on the rear binding point and moves to the position 11*d* on the front side. Meanwhile, the transfer gripper 12 is kept on standby at the position 12*b*, as it is for the first sheet set, until the stapler 11 is moved to the second stapling point after finishing the first stapling point. Then, it is moved to the position 12*a*, and after the stapler is moved to the front retracted position, it transfers the sheet set. As described above, in the two point binding mode, the position where the stapler is retracted is alternated between the front and rear sides in order to reduce the sheet processing time.

(C)-(iii) Single Point Rear Binding Mode

In this mode, the sheet set is bound on the rear side relative to the sheet edge center in the direction perpendicular to the sheet delivery direction; therefore, the movement of the stapler is opposite to the one in the mode (C)-(i). In other words, the stapler 11 shuttles between the rear side retracting position and the stapling position.

(D) Folding Mode

In the folding mode, a relatively long sheet in the sheet delivery direction is subjected to a folding operation in the folding apparatus 204 illustrated in FIG. 2. Thereafter, it is processed in the same manner as a regular size sheet. In other words, it is discharged into the bin; processed according to a selected mode; and deposited in the stacking unit 13. However, there is more than one way to fold a sheet: the so-called Z fold, which has a folded edge at the central portion of the sheet in the sheet delivery direction or on the slightly down stream side of the central portion; the C fold for folding a sheet of an overseas size LGL into the LTR size; or the like folds. In the case of these folds, it is liable that the leading edge of a folded sheet being discharged collides with, and/or slides in below, the folded edge of another sheet having been deposited on the bin, and as a result, the alignment of the sheets having been deposited is disturbed, and/or the folded sheet being discharged is not deposited in a proper manner. Therefore, a guide member 42 illustrated in FIGS. 10–12 is disposed on the bin, on the down stream side of the discharge roller, wherein this guide member 42 is projected over the folded sheet on the bin so that the folded sheet can be properly deposited and aligned.

As for the operation of the guide member 42, when the first folded sheet is discharged into each bin, the guide member is not activated. After the folded sheet is deposited in the bottommost bin for the first time, the guide member 42 is rotated in a manner to project into the space between the bins as illustrated by the top position outlined by the solid line, and then is lowered to the position outlined by the broken line, guiding thereby the in-coming folded sheet in such a manner as to prevent its leading edge from colliding with the folded edge of the folded sheet having been deposited. Then, after the second sheet is deposited, it is rotated out of the space occupied by the bin and the sheet on the bin. Next, as the bin module is lowered by one bin, whereby the bin immediately above the bottommost bin is disposed at the sheet receiving position, the guide member 42 is rotated into the bin interval, being thereby projected over the folded sheet, and then, is lowered to accommodate the next folded sheet.

The above described steps are repeated to deposit the folded sheet in each bin. However, this operation needs to be carried out only when the topmost sheet accumulated on the bin is a folded sheet and the leading edge of the next incoming sheet is liable to slip in below the folded edge of the topmost sheet. For example, in case a set of originals consists of a mixture of large size sheets and small size sheets, and only the large size sheets are folded, the guide member 42 does not need to be activated when a sheet is discharged immediately after a small size sheet is deposited on the bin.

Further, the speed at which the folded sheet set is moved to be transferred onto the stacking tray after the folded sheet is deposited on each bin is set to be relatively slow compared with the speed at which the plain sheet with no fold is moved. This arrangement is made to prevent the folded portion of the folded sheet from opening up, and thereby adversely affecting the sheet accumulating performance during a period in which the sheet delivery speed is increased or decreased, or a period in which the sheet is delivered at a high speed.

(E) Operation Involving a Plurality of Bin Modules

Next, the operation involving a plurality of bin modules (two modules in this embodiment) will be described. This operation can improve to the highest limit the overall operational efficiency of the system, including the post-image formation processing while maintaining the productivity of the copying machine main assembly 201.

When the number of the copy sets to be made is no more than the number of the bins in a bin module (six in the aforementioned embodiment), the sheet processing operation is carried out as described hereinbefore, but when it exceeds the number of the bins, two bins are alternately activated.

Referring to FIG. 2, at first, a first group of sheet sets is sorted using the top bin module B1, wherein the number of sheet sets in this group is the same as the number of the bins, that is, six in this embodiment. Next, while the gripping-stapling unit 9 at the broken line position transfers the sheet set from each bin of the top bin module to the stacking unit 13, the sheets are sorted into the bottom bin module B2. This switching between the top and bottom bin modules is accomplished by switching the orientation of the deflector 3. After the sorting for the bottom bin module is completed, the sheet set is moved out of each bin of the bottom bin module by the gripping-stapling unit and stacking unit 13 having been moved to the solid line position by this time. Meanwhile, the top bin module becomes empty as the sheet set is removed; therefore, as soon as the sorting for the bottom bin module is completed, the deflector 3 is re-directed to sort the sheet back again into the top bin module, allowing the sorting operation to be continued without interruption.

With this arrangement, the sheets discharged from the copying machine main assembly are deposited into either the top or bottom bin module without interruption. Therefore, it is unnecessary to stop the copying operation of the copying machine main assembly while carrying out the post-image formation sheet processing operation such as the removal of the sheet set from the bin, stapling of the sheet set, or the like. In other words, the entire process can be completed in a so-called stopless manner.

However, there is a mandatory condition for successfully running the stopless operation. That is, the smaller the number of the sheets in a set of originals is, the shorter the time necessary to complete the sorting for each bin module is, whereas the time necessary to remove the sheet set out of the bin remains substantially constant regardless of the sheet count of the set of originals. As the mandatory condition for the stopless operation, it is necessary that the sheet set removal from one bin module will have been completed, emptying thereby the bin module, by the time the sorting for the other bin module will be completed.

For example, let it be assumed that there is a set of originals containing m number of sheets of original, and this set is copied using a system containing two bin modules, each containing n number of bins. If the productivity of the copying machine main assembly is p number of sheets per minute, the time it takes to fill one of the bin modules with m×n number of sheets is (m×n)/P (min), that is, 60×(m×n)/P (sec).

If the time it takes to remove the sheet set from each bin is t1 sec, and the time it takes for the gripping-stapling unit and stacking unit to travel between the modules is t2 sec, the condition for the stopless operation to be accomplished is:

$$60\times(m\times n)/P \geqq n\times t1+t2$$

Therefore, when the sheet count m satisfies the following formula:

$$m \geqq P/60\cdot(t130\ t2/n)$$

the stopless operation is possible.

For example, when P=85 cpm, t1=3 sec, t2=3 sec: and n=6, m≧4.96; therefore, the stopless operation is possible as long as the sheet count of a set of originals is five or more.

It should be noted here that even the sheet count of a set of originals is no more than the count that makes it possible to run the stopless operation, the post-image formation sheet processing can be continued without involving the operator by interrupting temporarily the operation of the copying machine main assembly while the bin modules are switched.

(F) Number of Sheets Stackable on Stacking Unit

Referring to FIG. 2, the number of the sheets stackable on the stacking unit 13 is determined by a height l7 from the top surface of the stacking tray to the bottom of the bottom bin module. The position at which the sheet set is taken out of the bottom bin module is fixed at the position where the bin B12 is in FIG. 2; therefore, the sheet set is stored in a space that remains between the bottom surface of the stacking unit and the sheet set removal position after the necessary members are disposed.

On the other hand, it is possible to secure a more sufficient space between the sheet set removal position of the top bin module (position of the bin B14 in FIG. 2). In other words, as far as the sheet processing involving the top bin module is concerned, the sheet set can be accumulated as high as a height l8.

Suppose that the upper limits of the stacking height are l7 and l9 for the bottom bin module and top bin module, respectively, (l8>l9>l7). Up until the time immediately before the height of the sheet set stack in the stacking until exceeds the height l7, the post-image formation sheet processing operation is carried out using both bin modules, and thereafter, the operation can be continued using only the top bin module until immediately before the stack height exceeds the height l9. In this case, the operation ceases to be the two bin modules operation; therefore, even when the number of the sheet count of a set of originals is no less than the mandatory count for the stopless operation, the operation cannot be stopless, but at least, the operation can be continued.

Whether or not the upper limit for the stacking height is to be switched is determined when the sheet set removal from the top bin module is completed. At the time of the completion of the sheet set removal from the top bin module, the sheet set stack height l10 at this moment is determined from the distance the stacking tray descends. A stacking margin Δl for the maximum stacking height l7 of the bottom bin module is: Δl=l7−l10. Suppose that the sheet count of a set of originals being currently copied is m, and the number of the bins in each bin module is n. As long as the thickness l11 of a stack of m×n sheet sets is no more than Δl, the sheet set can be deposited from the bottom bin module, but when it exceeds the margin Δl, the sheet set cannot be deposited from the bottom bin module. Therefore, the maximum stacking height is switched from l7 to l9, and thereafter, the apparatus is controlled to use only the top bin module.

Figure 37:
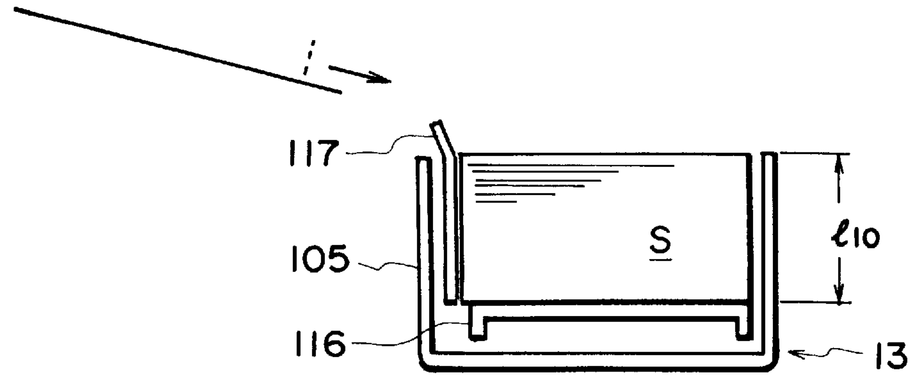
FIG. 37 is a schematic drawing for depicting an operation for switching the height limit of the sheet set stack.
Figure 38:
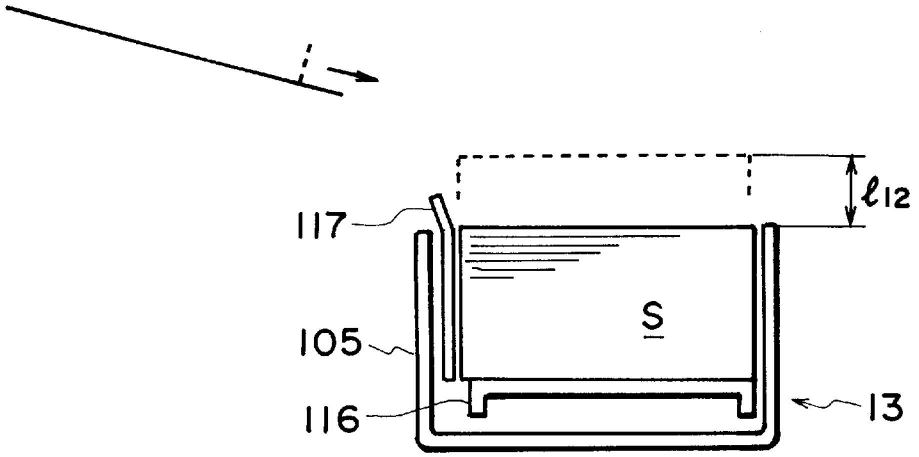
FIG. 38 is a schematic drawing for depicting the operation for switching the height limit of the sheet set stack.
Figure 39:
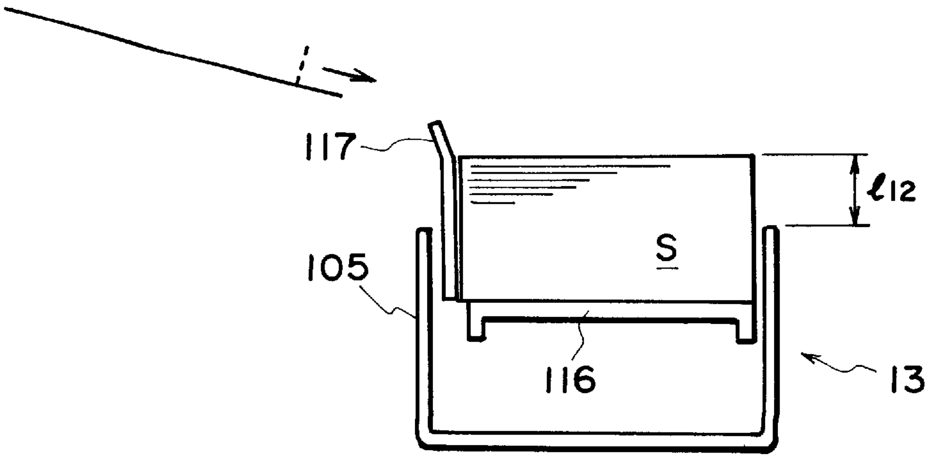
FIG. 39 is a schematic drawing for depicting the operation for switching the height limit of the sheet set stack

Referring to FIGS. 37–39, an operation for switching the aforementioned maximum stacking height will be described.

In FIG. 37, the stacking unit 13 is at the sheet set removal position for the top bin module, and the height l10 of the sheet set stack S on the stacking tray 116 leaves no room for the deposition of another sheet set relative to the maximum stacking height for the bottom bin module, which makes it necessary to switch the maximum stacking height.

Referring to FIG. 38, the entire stacking unit including stacking unit case 105, stacking tray 116, and stacking reference wall 117 is lowered by a height l12, which is the height to be increased.

Next, referring to FIG. 39, the stacking unit case 205 is left where it is, and only the stacking tray 116 and stacking reference wall 117 are raised by the height l12, being thereby returned to the original sheet set removal position.

(g) Number n of Bins in Bin Module

The number of bins in a bin module is optionally selected, but in order to maintain the productivity of the copying machine main assembly, it is preferable that the conditions, which will be described below, are satisfied.

Referring to FIG. 1, for example, when a double sided mode is selected, a sheet S on a deck 212 is not going to be discharged straight from the right to the left after an image is formed on the first surface. Instead, after passing through the fixing section 214, it is directed downward by a deflector 216; is turned over through a reversal path 217; and is dropped into an intermediary tray. Then, it is fed out of the intermediary tray 218; is passed through a re-feeding path 219 to have an image formed on the second surface; is passed through the fixing section 14; and then, is discharged out of the apparatus.

Here, an operation for making double sided copies from m sheets of double sided originals will be described. To begin with, n sheets of copies are made from the first surfaces of the m sheets of a set of originals, and delivered to the intermediary tray, wherein n is the number of the bins in each bin module. Next, the second surfaces of the m sheets of the same set of originals are copied on the correspondent second surfaces of the same n sheets on the intermediate tray.

At this point, a length l13 of a sheet delivery path, which starts from an image formation point 220 of the copying machine main assembly 201, continues through the double side mode path, and returns to the same point 220, will be described.

Assuming that a distance l14 between the leading edges of the two continuously conveyed sheets is the path length occupied by a single sheet, k number of sheets can be placed in the delivery path having the length of l13, wherein k=l14/l13.

Therefore, two situations are created by the quantitative relationship between n, which is the number of the bins per bin module, and k: a case in which the delivery path having the length l13 is completely filled with the sheets, and another case in which it is not filled up.

In other words, when n<k, the delivery path having the length of l13 is completely filled; therefore, there is going to a waste of time between the completion of the operation for copying the first surface and the beginning of the operation for copying the second surface. When n≦k, the operation for copying the second surface can be started immediately after the operation for copying the first surface; therefore, no time is wasted, increasing thereby the productivity of the copying machine main assembly in the double sided mode.

For example, when the sheet delivery path length l13 is 2,000 mm, and the path length l13 occupied by a single sheet is 350 mm, k is 5.7 (=l13/l14); therefore, it is preferable that the number of bins per bin module n satisfies: n≧[k]+1 ([k] is a maximum integer that does not exceed k). In this case, n≧6, and therefore, it is preferable that each bin module has no less than six bins.

Embodiment 2

Figure 40:
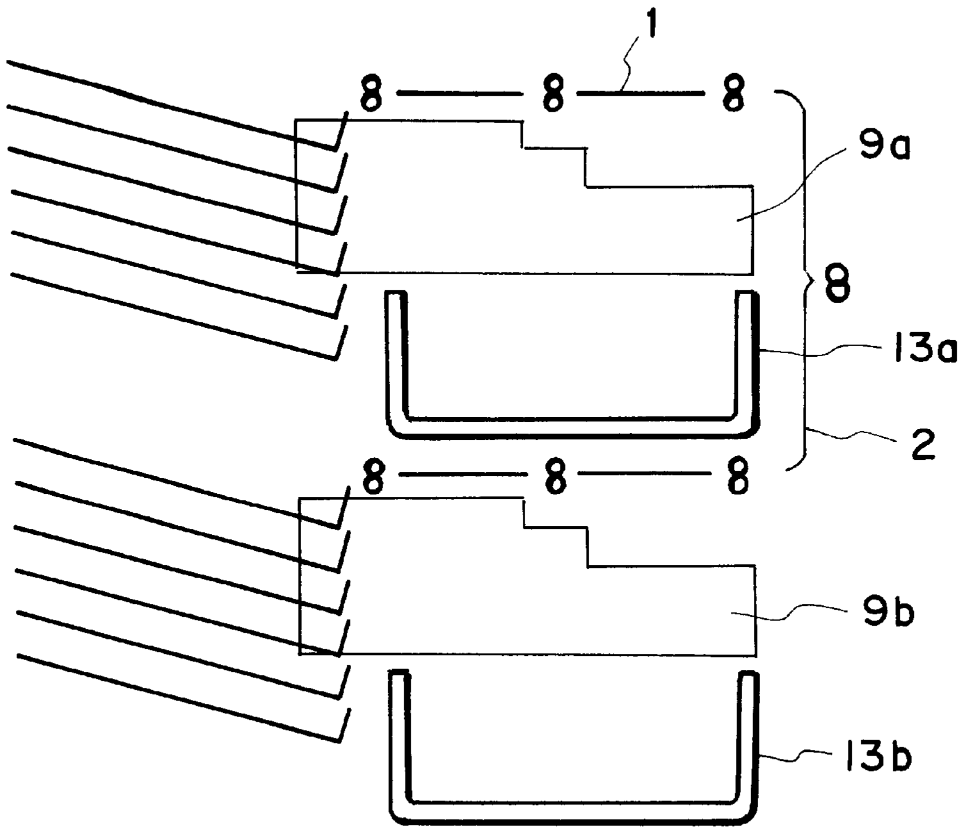
FIG. 40 is the second embodiment of the present invention.

In the case of the preceding embodiment, one sheet set transferring means, one post-image formation sheet processing means, and one stacking means are disposed between the top and bottom paths that deliver the sheets to the top and bottom bin modules, respectively, and these means take care of both top and bottom bin modules. However, the arrangement may be different as illustrated in FIG. 40, wherein sheet processing means 9*a* and 18*a* dedicated to the top bin module are disposed between a sheet delivery path 1 to the top bin module and a sheet delivery path 2 to the bottom bin module, and sheet processing means 9*b* and 13*b* dedicated to the bottom bin module are disposed below the sheet delivery path 2 to the bottom bin module.

In this case, it is unnecessary for the stacking means 13 to move between the bin modules, and at the same time, the sheet delivery path to the bottom bin module is shorter, being approximately the same as the one to the top bin module, which affords simplification of sheet delivery control.

Embodiment 3

Figure 41:
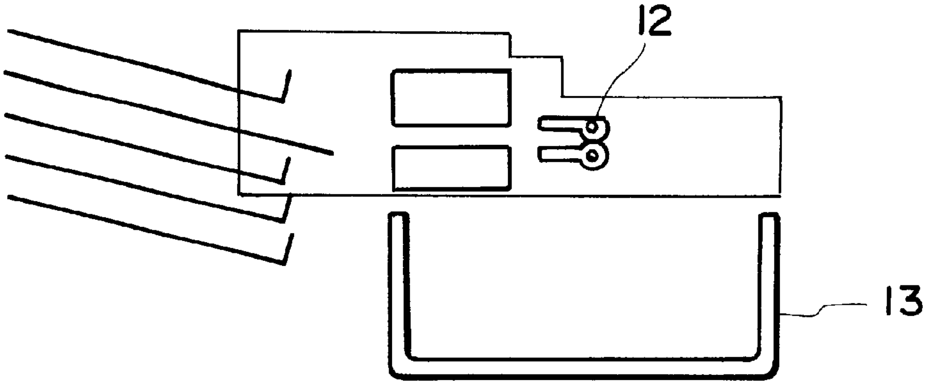
FIG. 41 is the third embodiment of the present invention.
Figure 42:
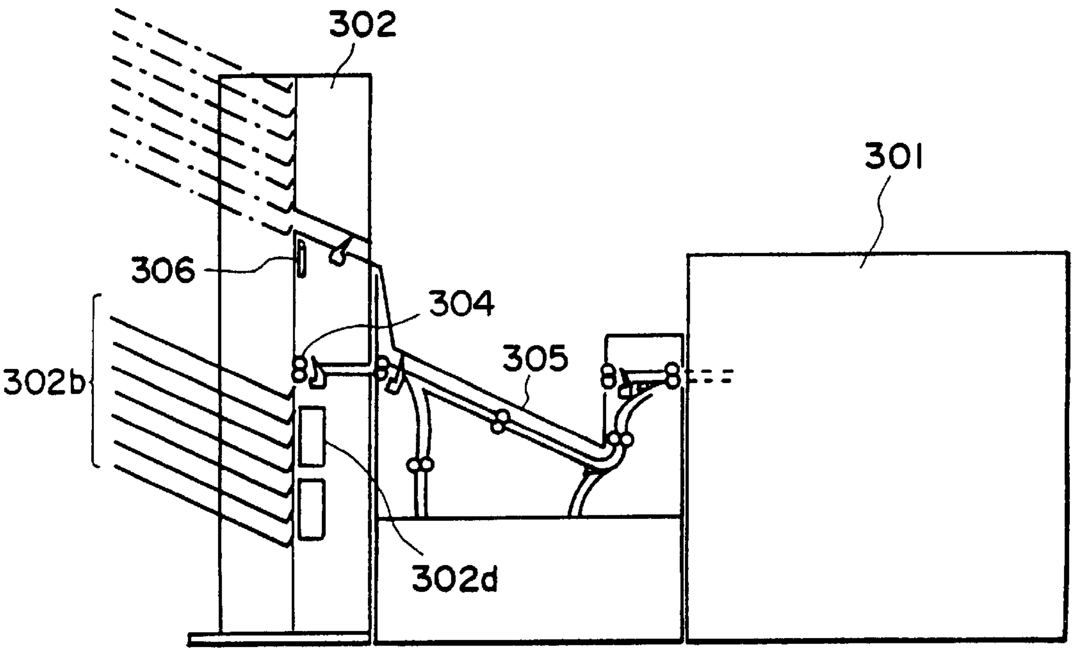
FIG. 42 PRIOR ART
FIG. 42 is a side view of a conventional post-image formation sheet processing apparatus.
Figure 43:
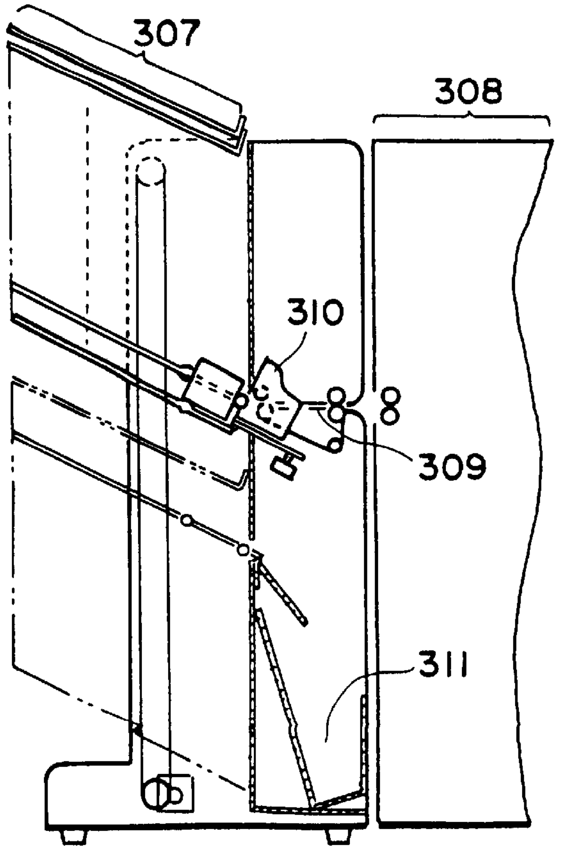
FIG. 43 PRIOR ART
FIG. 43 is a side view of another conventional post-image formation sheet processing apparatus.
Figure 44:
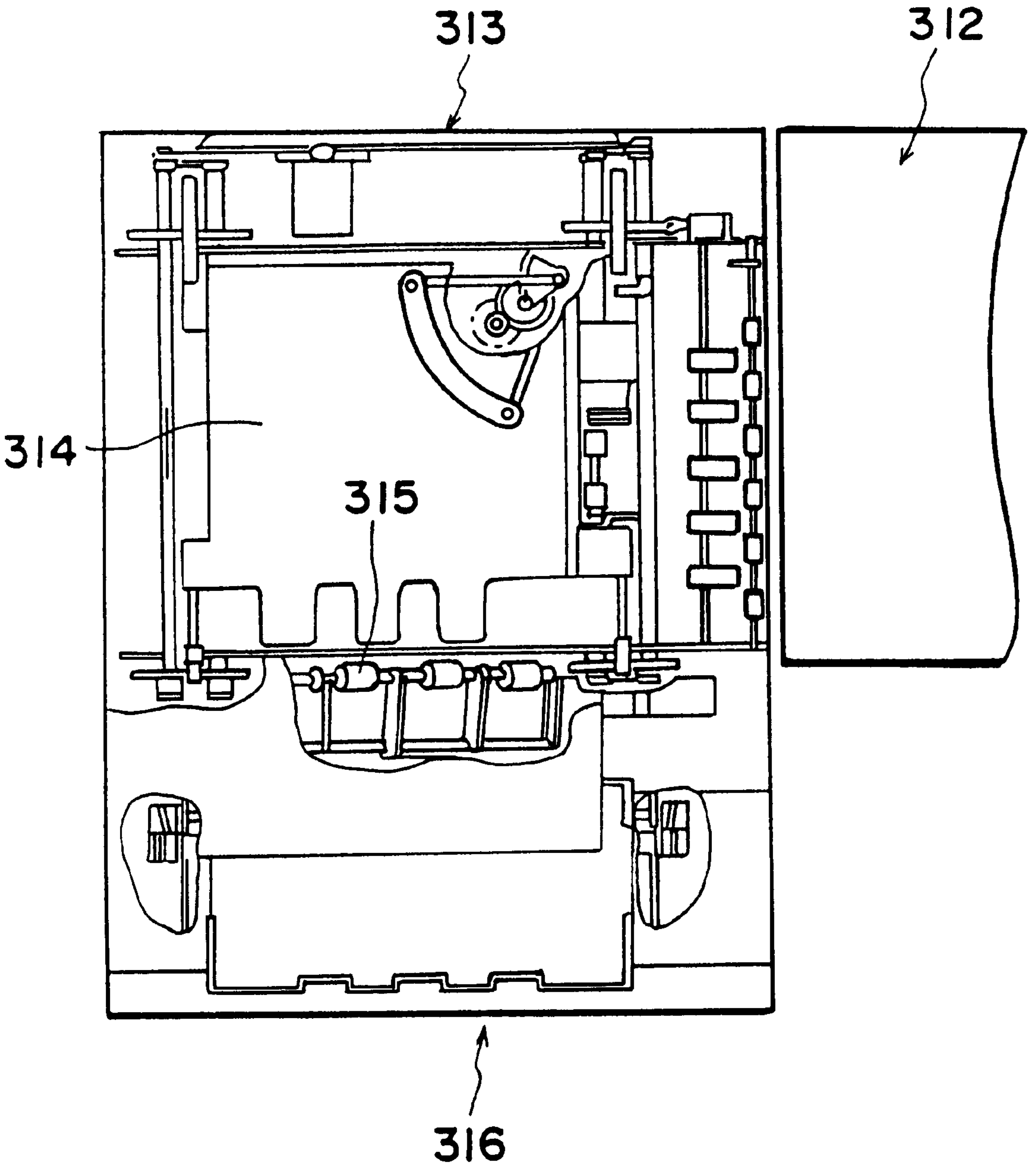
FIG. 44 PRIOR ART
FIG. 44 is a side view of another conventional post-image formation sheet processing apparatus.

In the preceding embodiments, the stapler is of a non-separable (single piece) type, but it may be of a separable type as shown in FIG. 41. In the preceding embodiment, the transfer gripper 2 cannot transfer the sheet set unless the stapler is retracted frontward or rearward after stapling the sheet set, but when a separable stapler is employed, the sheet set can be passed between the separated top and bottom pieces of the stapler; therefore, the time between the completion of stapling and the beginning of the sheet set transfer by the transfer gripper can be reduced. However, when the trailing edge of the sheet set falls down into the stacking unit 13, the separated bottom piece of the stapler interferes; therefore, at least the bottom piece of the stapler must be retracted out of the sheet path before the trailing edge of the street set reaches the reference wall of the stacker.

Needless say, after the completion of the stapling operation, the separated bottom piece of the stapler is movable at the same time as the transfer gripper 12 begins the sheet set transfer: therefore, two members can be moved with an overlapping timing to reduce further the combined time for moving these two members.

Embodiment 4

As for the post-image formation sheet processing means, it is a stapler in the cases of the preceding embodiments, but, it may be a different sheet processing means such as hole punching apparatus, gumming apparatus, back lining apparatus, or the like.

Embodiment 5

In the preceding embodiments, the gripper for transferring the sheet set and the stapler as the sheet processing means are integrated into a single unit, and the stacking unit is disposed therebelow. However, these moving members may be optionally combined. For example, each of the gripping member, stapling member, and stacking member may be organized as a unit independently movable in the vertical direction. Also, the gripping member and stacking member may be integrated into a single unit. In this case, the stapler does not need to be vertically moved when in the non-stapling mode, which offers such an advantage that the overall load imparted in the vertical direction decreases.

Embodiment 6

In the preceding embodiments, the sheet processing means comprises two bin modules, which are alternately used to process the sheet. However, the number of bin modules may be no less than three instead of two. If three bin modules and correspondent three sheet delivery paths are provided, the sheet set may be removed from one of three modules while the sheet is delivered to the other two; therefore, more timewise flexibility can be afforded compared with the double bin configuration, offering thereby a much better possibility for continuing the post-image formation sheet processing operation without temporarily stopping the copying machine main assembly as described in the preceding embodiments.

Embodiment 7

In the preceding embodiments, a plurality of bin modules comprising a plurality of bins are employed to alternate them while receiving the sheet by a single stacking tray. However, a plurality of stacking trays may be employed.

While the invention has been described with reference to the structures disclosed herein, it is not confined to the details set forth and this application is intended to cover such modifications or changes as may come within the purposes of the improvements or the scope of the following claims.

What is claimed is:

1. A sheet post-processing apparatus comprising:

a plurality of bin trays arranged in multiple levels with predetermined intervals;

discharging means for discharging a sheet to said bin trays;

stacking means supported upstream of said charging means in said apparatus so as to be moved in an arrangement direction of said plurality of bin trays; and transferring means for transferring the sheet to said stacking means from a bin tray having completed sheet reception, wherein said plurality of bin trays are divided into a plurality of groups, and said stacking means can be set at each sheet transfer position for each bin tray group.

2. A sheet post-processing apparatus comprising:

a plurality of bin trays arranged in multiple levels at predetermined intervals;

discharging means for discharging a sheet to said bin trays;

stacking means supported in said apparatus so as to be moved in a bin arrangement direction of said plurality of bins;

sheet binding means movable in the bin arrangement direction in synchronism with said stacking means; and transferring means for transferring the sheet to said stacking means from a bin tray having completed sheet reception, wherein said plurality of bin trays are divided into a plurality of groups, and said stacking means can be set at each sheet transfer position for each bin group.

3. An apparatus according to claim 2, further comprising sheet set moving means for moving a set of the sheets on a bin tray to said binding means.

4. An apparatus according to claim 1, wherein bins in each group is movable by one bin level at a time so that each bin tray can be sequentially positioned to face said sheet discharging opening and a sheet set transferring position.

5. An apparatus according to claim 4, wherein said discharging means comprises a sheet discharging opening and a sheet delivery path for each of the bin groups, and said stacking means is disposed within a space surrounded by the sheet delivery paths.

6. A sheet post-processing apparatus comprising:

a plurality of bin trays arranged in multiple levels at predetermined intervals;

discharging means for discharging a sheet to said bin trays;

stacking means supported upstream of said discharging means in said apparatus so as to be moved in a bin arrangement direction of said plurality of bin trays; and transferring means for transferring the sheet to said stacking means from a bin tray having completed sheet reception, wherein said discharging means comprises a plurality of discharging openings and a plurality of sheet delivery paths, and said stacking means is disposed in a space surrounded by the plurality of sheet delivery paths.

7. An image forming apparatus comprising:

image forming means;

feeding means for feeding medium in the form of a sheet to said image forming means;

a plurality of bin trays arranged in multiple levels at predetermined intervals;

discharging means for discharging the sheet to said bin trays, on which an image has been formed;

stacking means supported upstream of said discharging means in said apparatus so as to be moved in a bin arrangement direction of said plurality of bin trays; and transferring means for transferring the sheet to said stacking means from a bin tray having completed sheet reception, wherein said plurality of bin trays are divided into a plurality of groups, and said stacking means can be set at each sheet transfer position for each bin tray group.

8. A sheet post-processing apparatus comprising:

a plurality of bin trays arranged in multiple levels with predetermined intervals;

discharging means for discharging a sheet into said plurality of bin trays;

stacking means supported on the upstream side of said sheet discharging means so as to be moved in an arrangement direction of said plurality of bins and so as to be set at a plurality of stacking positions faced to a group of said bin trays having received the sheets;

moving means for moving the plurality of bin trays step by step in the arrangement direction; and transferring means for transferring the sheet to said stacking means from said bin tray having completed sheet reception.

9. An apparatus according to claim 8, further comprising sheet binding means movable in the bin arrangement direction in synchronism with said stacking means.

10. An apparatus according to claim 9, further comprising sheet set moving means for moving a set of the sheets on a bin tray to said binding means.

11. An apparatus according to claim 8, wherein said plurality of bin trays are divided into a plurality of groups, and said stacking means can be set at each sheet transfer position for each bin tray group.

12. An apparatus according to claim 11, wherein said discharging means comprises a sheet discharging opening and a sheet delivery path for each of bin tray groups, and said stacking means is disposed within a space surrounded by said sheet delivery paths.

13. An apparatus according to claim 11, wherein bin trays in each group can be movable by one bin tray level so that each bin trays can be sequentially positioned to face said sheet discharging opening and sheet set transferring position.

14. An apparatus according to claim 8, wherein said discharging means comprises a plurality of discharging openings and a plurality of sheet delivery paths, and said stacking means is disposed in a space surrounded by said plurality of sheet delivery paths.

15. An image forming apparatus comprising:

image forming means;

feeding means for feeding a medium in the form of a sheet to said image forming means;

a plurality of bin trays arranged in multiple levels with predetermined intervals;

discharging means for discharging the sheet, on which an image has been formed;

stacking means supported on an upstream side of the sheet set discharging means so as to be moved in an arrangement direction of said plurality of bins and so as to be set at a plurality of stacking positions faced to a group of said bin trays having received the sheets;

moving means for moving the plurality of bin trays step by step in the arrangement directions; and transferring means for transferring the sheet to said stacking means from said bin tray having completed sheet reception.

16. A sheet post-processing apparatus comprising:

a plurality of bin trays arranged in multiple levels with predetermined intervals;

discharging means for discharging a sheet to said bin trays;

stacking means supported in said apparatus so as to be moved in an arrangement direction of said plurality of bins and so as to be set at a plurality of stacking positions faced to a group of said bin trays having received the sheets;

binding means movable in the bin tray arrangement direction so as to be set at a plurality of binding positions faced to a group of said bin trays having received the sheets;

moving means for moving the plurality of bin trays step by step in the arrangement direction; and controlling means for controlling said binding means and stacking means to permit a set of the sheets in the bin tray having completed sheet reception to be bound and stacked.

17. An apparatus according to claim 16, wherein said binding means binds the sheet set advanced from said bin tray.

18. An apparatus according to claim 16, wherein said discharging means comprises a plurality of discharging means, and each of a stacking means and binding means can be set at an operating position corresponding to each of said plurality of discharging means.

19. An apparatus according to claim 16, wherein said plurality of bin trays are divided into a plurality of groups, and each of said stacking means and binding means is set at an operating position correspondent to each bin tray group.

20. An apparatus according to claim 19, wherein each group of bin trays is movable by one bin tray level at a time so that each bin tray can be sequentially positioned to face said operating position.

21. An image forming apparatus comprising:

image forming means;

feeding means for feeding a sheet to said image forming means;

a plurality of bin trays arranged in multiple levels with predetermined intervals;

discharging means for discharging the sheet, on which an image has been formed, into said plurality of bin trays;

stacking means supported in said apparatus so as to be movable along said plurality of bin trays in an direction of the bin tray arrangement and so as to be set at a plurality of stacking positions faced to a group of said bin trays having received the sheets;

sheet binding means movable in the bin tray arrangement direction so as to be set at a plurality of binding positions faced to a group of said bin trays having received the sheets;

moving means for moving the plurality of bin trays step of step in the arrangement direction; and controlling means for activating said binding means and stacking means so that the sheets in the bin tray having completed sheet set reception are bound and stacked.

22. A sheet post-processing apparatus comprising:

a plurality of bin trays, being arranged in multiple levels with predetermined intervals;

binding means movable along said plurality of bin trays in a bin tray arrangement direction so as to be set at a plurality of binding positions faced to a group of bin trays having received the sheets;

driving means for driving said plurality of bin trays by one bin level at a time; and controlling means for activating said binding means so that said binding means binds sheet sets in a group of bin trays, for which the sheet discharging operation is completed.

23. A sheet post-processing apparatus according to claim 22, wherein said plurality of bin trays are divided into a plurality of groups, and wherein said discharging means comprises a plurality of discharging openings, each of which corresponds to one of said plurality of bin tray groups.

24. An image forming apparatus comprising:

image forming means;

feeding means for feeding a sheet form;

a plurality of bin trays, being arranged in multiple levels with predetermined intervals;

discharging means for discharging the sheet, on which an image has been formed, into said bin tray;

binding means movable along said plurality of bin trays in a direction of bin tray arrangement so as to be set at a plurality of binding positions faced to a group of said bin trays having received the sheets;

driving means for moving each of the bin trays by one bin level at a time; and controlling means for controlling said binding means so that said binding means binds sheet sets in each bin tray group, for which the sheet discharging operation has been completed.

25. A sheet post-processing apparatus comprising:

a plurality of sheet receiving means for storing a sheet or a set of sheets discharged from a sheet outputting apparatus which outputs the sheet;

a plurality of sheet delivering sections for delivering the sheet onto said sheet receiving means;

sheet set advancing means for advancing the sheet set stored by said sheet receiving means;

sheet post-processing means for processing the advanced sheet set; and stacking means for storing in a stack the post-processed sheet sets, wherein said sheet set advancing means, said sheet post-processing means, and said stacking means are disposed between a sheet discharging opening of the sheet outputting apparatus and said plurality of sheet receiving means.

26. A sheet post-processing apparatus according to claim 25, wherein said sheet set advancing means, sheet post-processing means, and stacking means are disposed concentrically at a single location within a space formed between said plurality of sheet delivering sections.

27. An apparatus according to claim 25, wherein said sheet post-processing means is disposed directly above said stacking means, within a sheet set advance range where said sheet set advancing means advances the sheet set.

28. An apparatus according to claim 25, wherein said sheet set advancing means, sheet post-processing means, and stacking means are vertically movable.

29. An apparatus according to claim 25, wherein said sheet set advancing means comprises a plurality of gripping means, and while the sheet set is advanced, the sheet set is relayed from one gripping means to another among said plurality of gripping means.

30. An image forming apparatus comprising an image forming means for forming an image on a sheet and sheet post-processing apparatus according to claim 24.

31. A sheet post-processing apparatus according to claim 1, wherein in each bin tray group, the bin tray position at which the bin tray receives the sheet from said discharging means is different from the bin tray position at which the sheet set is transferred by said sheet set transferring means.

32. A sheet post-processing apparatus according to claim 31, where said plurality of bin trays are divided into two groups, and two of such discharging means are provided faced to each group, and said sheet post-processing means is movable between the discharging means.

33. A sheet post-processing apparatus according to claim 31, wherein said apparatus further comprises sheet post-processing means for processing the sheets accumulated on the bin tray, and two of such discharging means are provided faced to each group, and said sheet post-processing means is movable between the discharging means.

34. An apparatus according to claim 25, wherein said sheet post-processing means includes means for binding the advanced sheet set.

35. An apparatus according to claim 25, wherein said sheet post-processing means includes means for punching a hole through the advanced sheet set.

36. An apparatus according to claim 33, wherein said sheet post-processing means includes means for binding the transferred sheet set.

37. An apparatus according to claim 33, wherein said sheet post-processing means includes means for punching a hole through the transferred sheet set.

38. A sheet post-processing apparatus comprising:

a plurality of bin trays arranged in multiple levels at predetermined intervals;

discharging means for discharging a sheet to said bin trays;

stacking means supported upstream of said discharging means in said apparatus; and transferring means for transferring the sheet to said stacking means from a bin tray having completed sheet reception, wherein said discharging means includes a plurality of discharging openings and a plurality of sheet delivery paths, and said stacking means is disposed in a space surrounded by the plurality of sheet delivery paths.

39. A sheet post-processing apparatus comprising:

a plurality of bin trays arranged in multiple levels with predetermined intervals;

discharging means for discharging a sheet to said bin trays;

stacking means movable in the bin tray arrangement direction so as to be set as a plurality of stacking positions and to face a group of said bin trays having received the sheets;

binding means movable in the bin tray arrangement direction so as to be set at a plurality of binding positions and to face a group of said bin trays having received the sheets;

moving means for moving the plurality of bin trays step by step in the arrangement direction; and controlling means for controlling said binding means and stacking means to permit a set of the sheets in the bin tray having completed sheet reception to be bound and stacked.

40. An image forming apparatus comprising:

image forming means;

feeding means for feeding a sheet to said image forming means;

a plurality of bin trays arranged in multiple levels with predetermined intervals;

discharging means for discharging the sheet, on which an image has been formed, into said plurality of bin trays;

stacking means movable in the bin tray arrangement direction so as to be set at a plurality of stacking positions and to face a group of said bin trays having received the sheets;

sheet binding means movable in the bin tray arrangement direction so as to be set at a plurality of binding positions and to face a group of said bin trays having received the sheets;

moving means for moving the plurality of bin trays step by step in the arrangement direction; and controlling means for activating said binding means and stacking means so that the sheets in the bin tray having completed sheet reception are bound and stacked.

41. A sheet post-processing apparatus comprising:

a plurality of bin trays arranged in multiple levels at predetermined intervals;

discharging means for discharging a sheet to said bin trays;

stacking means movable upstream of said discharging means in a bin tray arrangement direction so as to be set at a plurality of stacking positions and to face a group of said bin trays having received the sheets;

binding means movable in the bin tray arrangement direction so as to be set at a plurality of binding positions and to face a group of said bin trays having received the sheets;

controlling means for controlling said binding means and stacking means to permit a set of the sheets in the bin tray having completed sheet reception to be bound and stacked.

42. A sheet post-processing apparatus comprising:

a plurality of bin trays arranged in multiple levels with predetermined intervals and divided into two groups;

two discharging means faced to each groups and for discharging a sheet to said bin trays;

stacking means movable in the bin tray arrangement direction so as to be set at two stacking positions and to face a group of said bin trays having received the sheets;

binding means movable in the bin tray arrangement direction so as to be set at two binding positions and to face a group of said bin trays having received the sheets;

moving means for moving the plurality of bin trays in each group step by step in the arrangement direction; and controlling means for controlling said binding means and stacking means to permit a set of the sheets in the bin tray having completed sheet reception to be bound and stacked.

43. An apparatus according to claim 42, further comprising sheet set feeding means for feeding a set of sheets from said bin tray to said binding means and then feeding it to said stacking means.

* * * * *

UNITED STATES PATENT AND TRADEMARK OFFICE

CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 1:

Line 22, "301" should be deleted.
Line 23, "apparatus" should read --apparatus 301--.
Line 36, "sheet" should read --sheets--.
Line 44, "sate" should read --sets--.
Line 61, "it only" should read --is only--.

COLUMN 2:

Line 35, "these" should read --this--.

COLUMN 3:

Line 36, "is side" should read --is a side--.

COLUMN 4:

Line 63, "by a" should read --by an--.
Line 67, "by a" should read --by an--.

COLUMN 5:

Line 3, "8a, 8c" should read --8a, 8b--.
Line 61, "16a, or" should read --16a, 16b or--.

UNITED STATES PATENT AND TRADEMARK OFFICE
CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 7:

Line 7, "does" should be deleted.
Line 58, "accuride" should read --ACCURIDE®-.

COLUMN 8:

Line 13, "front" should read --from--.
Line 52, "fruit" should read --from--.

COLUMN 9:

Line 17, "it Is" should read --it is--.
Line 33, "13 in" should read --(13 in--.

COLUMN 10:

Line 5, "a aligning" should read --an aligning--.
Line 28, "an enough" should read --enough of a--.

COLUMN 11:

Line 11, "arrow" should read --arrow mark--.
Line 24, "apparatus,; set" should read --apparatus,is set--.

UNITED STATES PATENT AND TRADEMARK OFFICE

CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 13:

Line 10, "staler" should read --stapler--.
Line 39, "aid" should read --and--.

COLUMN 16:

Line 2, "Bq;" should read --8q;--.
Line 24, "to he" should be --to be--.

COLUMN 17:

Line 26, "an bottom" should read --a bottom--.
Line 41, "bind" should read --bin--.

COLUMN 18:

Line 62, "FIG. 1.5" should read --FIG. 15--.
Line 63, "interferes" should read --interfere--.

COLUMN 19:

Line 49, "end the" should read --end of the--.
Line 55, "and is" should read --is--.
Line 62, "original" should read --originals--.

UNITED STATES PATENT AND TRADEMARK OFFICE

CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 20:

Line 25, "original" should read --originals--.

COLUMN 21:

Line 23, "well" should read --wall--.

COLUMN 22:

Line 28, "oil" should read --on--.

COLUMN 23:

Line 20, "liable" should read --likely--.

COLUMN 25:

Line 3, "$m \geqq \cdot P/60 \cdot (t130+2/n)$" should read --$m \geqq \cdot P/60 \cdot (t1 + t2/n)$--.

COLUMN 26:

Line 50, "going to" should read --going to be--.

CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 27:

Line 33, "street set" should read --sheet set--.

COLUMN 28:

Line 22, "charging" should read --discharging--.
Line 50, "bins" should read --a bin--.
Line 52, "sheet" should be deleted.
Line 53, "opening" should read --means--.

COLUMN 29:

Line 55, "each of" should read --each-- and "groups," should read --group,--.
Line 60, "trays" should read --tray--.

COLUMN 30:

Line 42, "said" should read --a--.
Line 46, "of a" should read --of said--.
Line 67, "an direction" should read --a direction--.

UNITED STATES PATENT AND TRADEMARK OFFICE

CERTIFICATE OF CORRECTION

PATENT NO. : 5,951,000

DATED : September 14, 1999

INVENTOR(S): MASAAKI SATO, ET AL.

It is certified that error appears in the above-identified patent and that said Letters Patent is hereby corrected as shown below:

COLUMN 31:

Line 9, "of step" should read --by step--.

COLUMN 32:

Line 17, "claim 24." should read --claim 25.--.

Signed and Sealed this

Fifth Day of December, 2000

Attest:

Q. TODD DICKINSON

*Attesting Officer*

*Director of Patents and Trademarks*